United States Patent [19]

Cason et al.

[11] 4,445,194

[45] Apr. 24, 1984

[54] MULTIDIRECTIONAL CURSOR MOTION

[75] Inventors: William C. Cason, Austin; Ward A. Kuecker, Round Rock; Susan D. LaPlant, Austin, all of Tex.

[73] Assignee: International Business Machines Corporation, Armonk, N.Y.

[21] Appl. No.: 208,568

[22] Filed: Nov. 20, 1980

[51] Int. Cl.³ .............................................. G06F 3/153
[52] U.S. Cl. ...................................... 364/900; 340/709
[58] Field of Search ... 364/200 MS File, 900 MS File; 340/709, 710

[56] References Cited

U.S. PATENT DOCUMENTS

| | | | |
|---|---|---|---|
| 3,248,705 | 4/1966 | Dammann et al. | 364/900 |
| 3,675,208 | 7/1972 | Bard | 364/900 |
| 3,848,232 | 11/1974 | Leibler et al. | 364/200 |
| 3,872,460 | 3/1975 | Fredrickson et al. | 340/709 |
| 3,974,493 | 8/1976 | de Cavaignac et al. | 364/900 X |
| 4,040,024 | 8/1977 | Cowe et al. | 364/900 |
| 4,057,849 | 11/1977 | Ying et al. | 364/200 |
| 4,101,879 | 7/1979 | Kawati et al. | 340/709 |

Primary Examiner—Harvey E. Springborn
Attorney, Agent, or Firm—Harold E. Meier

[57] ABSTRACT

Operator keystrokes are processed in a text processor system to move a cursor on a display screen in either a vertical or horizontal direction or both without limitation as to the location of text. Keystroke data is processed under the control of programs stored in a random access memory. For a cursor motion, the random access memory of the system is structured to include a text storage buffer and a display control block both interconnected to an applications program and a display access method program. Data is stored in the text storage buffer in an unformatted configuration and the programs equate a contextual cursor address with a spatial cursor position. After running the display access method program in accordance with application program commands, a refresh buffer provides display signals to visually present by means of the display screen a cursor at an identified position in text.

20 Claims, 27 Drawing Figures

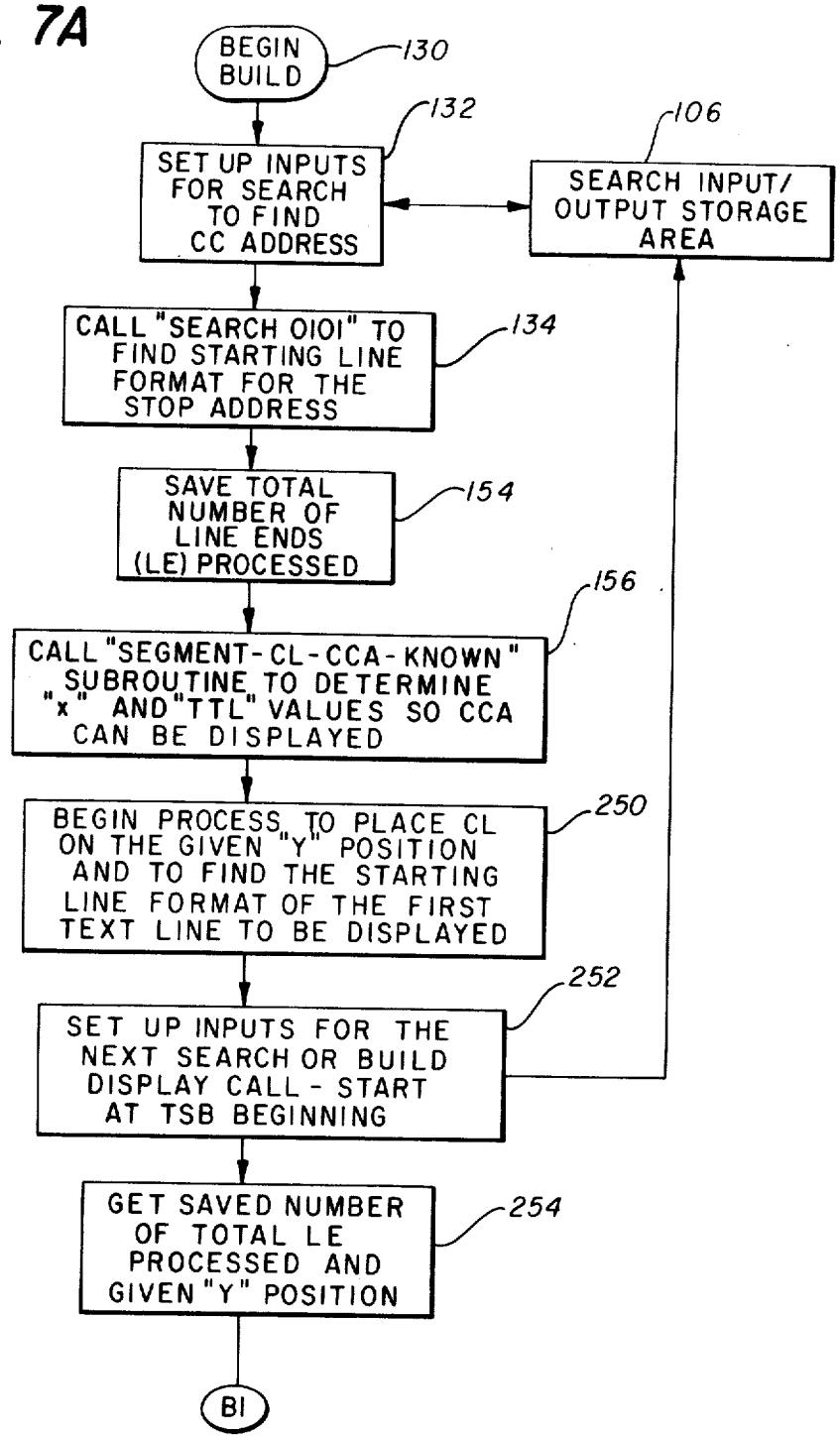

* "N" = NUMBER OF LINE ON DISPLAY.

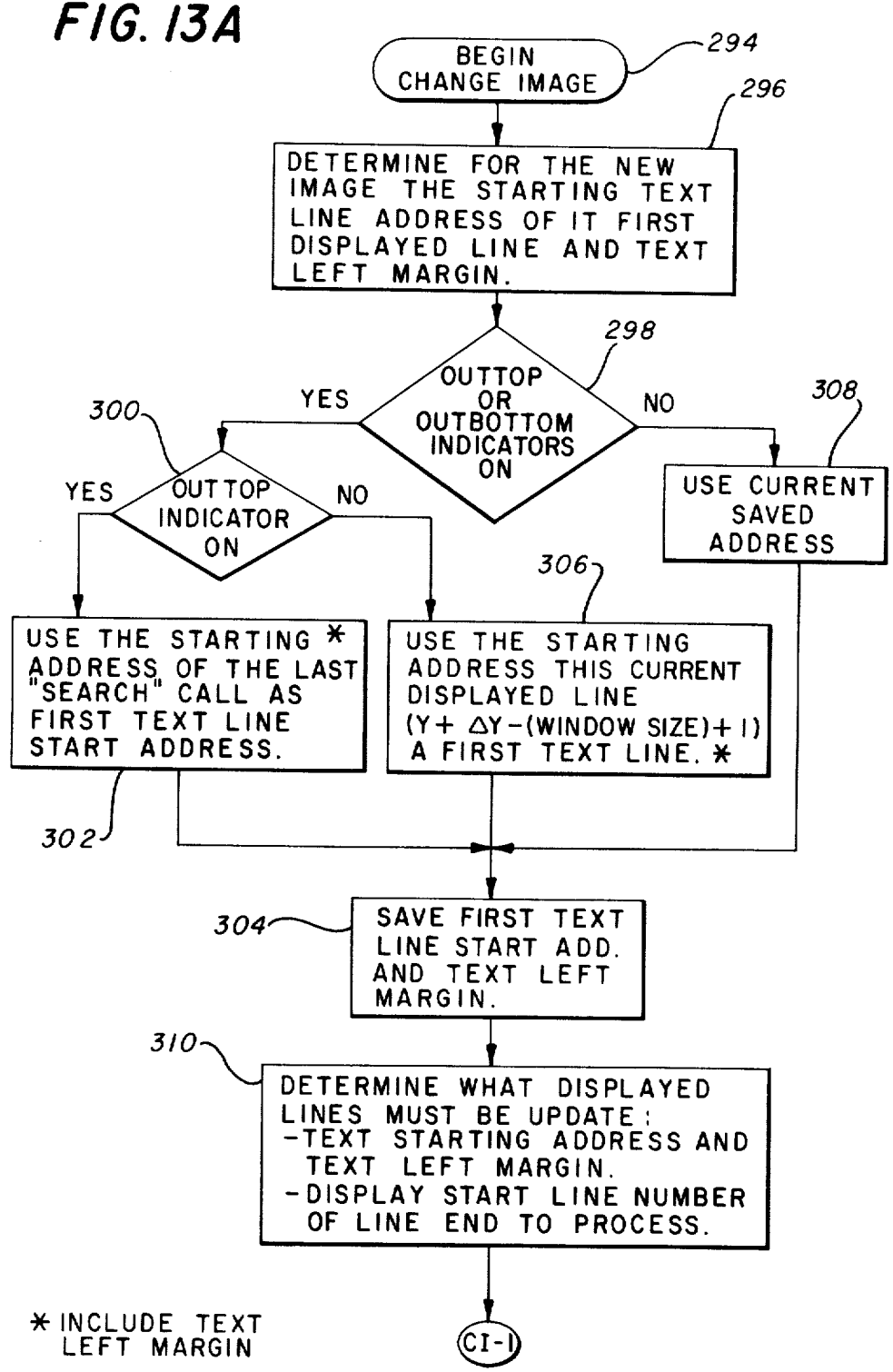

DCC ≙ DISPLAYABLE CHARACTER COUNT
DYFCOFFS ≙ NO. OF DISPLAYABLE CHARS. BEFORE
WHITE SPACE RIGHT — CURSOR IN RIGHT MARGIN
WHITE SPACE LFT. — CURS. IN LFT. MARG. OR TEMP. MARG.
WHITE SPACE MIDTEXT — CURS. IN TEXT GENERATED
 WHITE SPACE , i.e. TABS

MULTIDIRECTIONAL CURSOR MOTION

TECHNICAL FIELD

This invention relates to cursor motion on a display screen in a text processing system, and more particularly to multi-directional motion of a cursor on a display of text stored in an unformatted configuration.

BACKGROUND ART

Office machines for processing text data to produce hard copies utilize display screens for presenting to an operator visual text as it would appear on hard copy. Typically, such machines incorporate a conventional typewriter keyboard with additional control keys for operator interface with the system controls. The operator keystrokes are displayed on a screen quite similar to a home television receiver screen. This screen either displays a full page of text, a partial page, or in some machines only a single line of text. The display not only provides a visual presentation to the operator of the text being prepared but also provides prompting instructions for the operator of how to interface with the machine.

Responding to the keyboard strokes of an operator are system controls including programmed computers which prepare the text display. Most present day text processing systems include electronics hardware programmed to evaluate the operator keystrokes and to control the display. This electronics hardware includes memory for storing character data and instruction data for future use in editing and the preparation of hard copy. Ease of operation of the machine for the operator is in large part determined by the electronics and the associated computers and programs therefor.

One area of importance in determining the ease with which an operator interfaces with a machine is the movement of a cursor, that is, an identification mark on the screen indicating a character position. A cursor is used by an operator in text editing functions including the insertion of additional characters into text, identifying characters or blocks of characters to be moved, deleted or copied, and the reformatting of the text display. Heretofore, many text processing systems restricted the cursor motion to displayed text. That is, to move a cursor from one part of a screen from another required the cursor to be moved line by line through the displayed text. When such machines utilize formatted text stored memory, this restriction on cursor motion was found acceptable. However, the use of unformatted memory for storing character or instruction data resulted in the inefficient use of storage space and compromised the requirement for large storage capability in memory.

DISCLOSURE OF THE INVENTION

According to the present invention, the cursor is movable on a display screen of a text processing system in two directions horizontally and in two directions vertically. In shorthand notation this is referred to as "X-Y" cursor motion. The cursor will move in both the vertical and horizontal directions through lines of text, across lines of text, and through display space free of any text display. This latter space is identified as "white space".

To improve operator interface between the machine keyboard and the display screen the electronics hardware controls the rate of advance of the cursor in a vertical direction at a slower rate than in the horizontal direction. For example, the cursor is constrained to move in a horizontal direction at the rate of 14 characters per second, while it is constrained to move in the vertical direction at half this rate, that is, at a rate of 7 characters per second. This slower motion of the cursor in the vertical direction results in a more easily observable display while allowing the cursor to move at a rapid rate in the horizontal direction. A high character rate per second motion for a cursor in the vertical direction would make the display appear to an operator as a wave motion and would be disturbing to the operator.

In accordance with the present invention, a cursor is spatially positioned on a display screen by identification of the spatial point by line and character position. Character data and instructional data is stored in unformatted memory such that there is no direct correlation between the spatial position of the cursor on the display and a character position in memory. The cursor is movable across so-called white space even though there is no identifiable location for such space in memory.

Where operator keystrokes are processed and result in movement of the cursor beyond the display limits, the display data is rebuilt to show overlapping segments. When motion of the cursor is in the vertical direction it must be segmented and rebuilt to add and subtract lines of text. When cursor motion is in the horizontal direction the display is rebuilt with overlapping segments. Where cursor motion is along a given line within displayed text, the displayed information will be updated on a line basis. For any motion of the cursor, however, there must be developed an equivalency between the spatial cursor position in the display and a cursor byte in memory, hereinafter identified as a "contextual cursor". Thus, before the display is either rebuilt or updated the contextual cursor is made equivalent to the spatial cursor position.

More specifically, according to the present invention, a cursor is movable in the horizontal and vertical directions on a display screen containing text and blank character spaces (white space) in response to an operator keystroke. A cursor's keystroke is processed into a spatial cursor position to identify a new cursor spatial location on the display. A text storage buffer is searched for a contextual cursor address and also the address of an associated character, although it should be understood that the associated character may not be at the same spatial position on the display as the cursor. The spatial cursor position is compared with the storage buffer position of the contextual cursor to determine if an equivalency exists therebetween. Where an equivalency does not exist, the contextual cursor address is made equivalent to the spatial cursor position and the cursor is displayed at the new spatial location.

The invention relates to both the method and apparatus for moving a cursor in horizontal and vertical directions in a text processing system. Apparatus includes hardware for processing keystroke data and stored data in accordance with stored program instructions.

BRIEF DESCRIPTION OF THE DRAWINGS

A more complete understanding of the invention and its advantages will be apparent from the specification and claims and from the accompanying drawings illustrative of the invention.

Referring to the drawings:

FIG. 3 is a detail showing the formatting of the storage for the system of FIG. 1 as structured for multidirectional cursor motion;

FIGS. 7A and 7B shows the operation of one of the subroutines called during the sequence of FIG. 6 for building a display image in a refresh buffer;

FIGS. 13A and 13B illustrates the operation of a subroutine called during the servicing of the subroutines of FIGS. 12 and 12B and 14A, 14B, and 14C;

DETAILED DESCRIPTION

Figure 1:
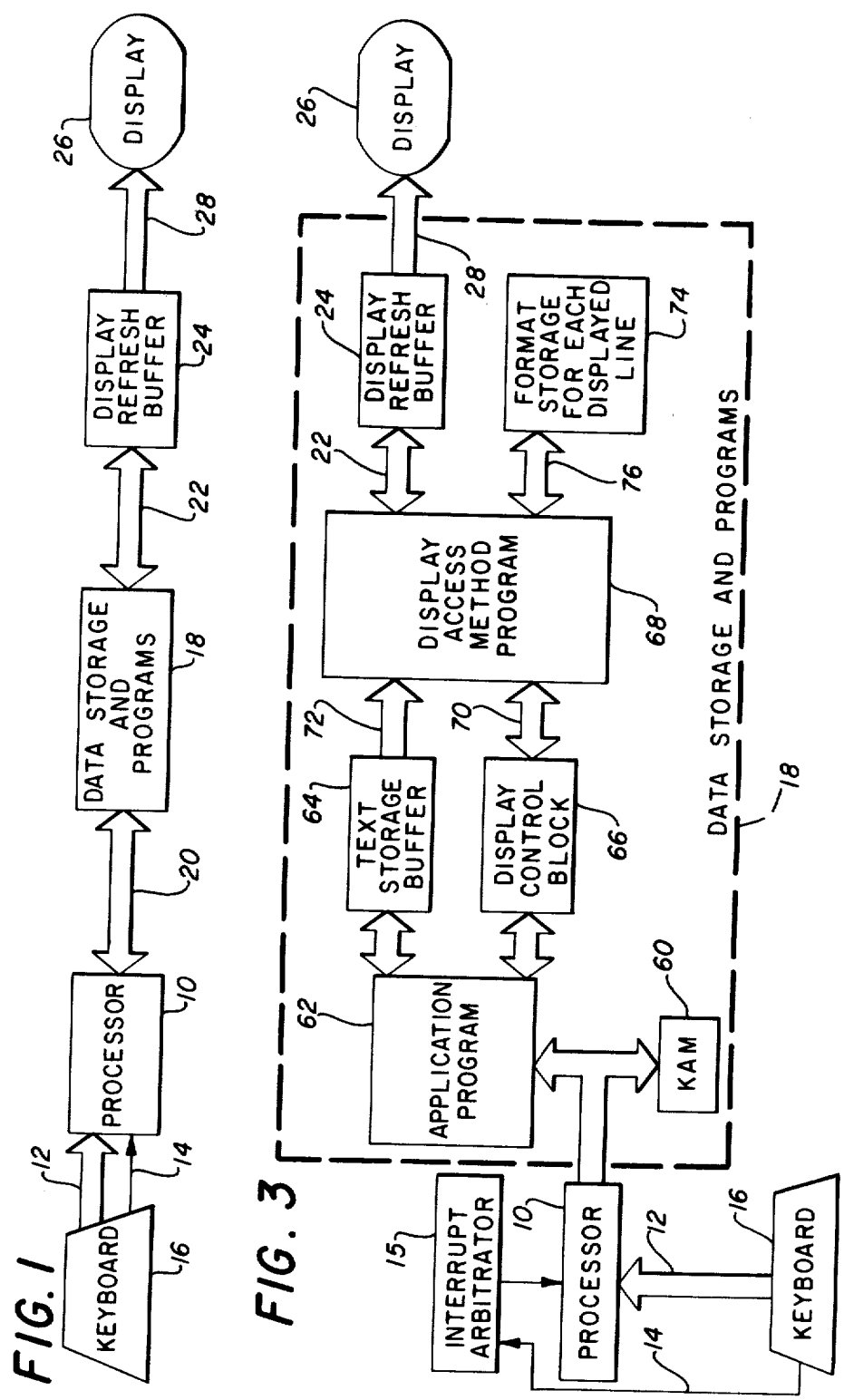
FIG. 1 is a basic block diagram of a text processing system including a keyboard, processor, memory storage and a display screen for visual presentation to an operator of text and operating instructions.

Referring to FIG. 1, a text processing system is shown including a processor 10, interconnected by means of a data bus 12 and control lines 14 to a keyboard 16. Included on the keyboard are conventional alpha-numeric characters found on the standard typewrite keyboard. In addition the keyboard includes symbol keys, such as backspace, carrier return and tab settings along with function keys used to instruct the system to perform certain operations, to control the way a display is created, or to provide information about stored textual data. In addition, the keyboard includes code keys that are used in conjunction with another key to input special instructions to the processor 10.

Keystroke data transferred to the processor 10 over the data bus 12 in the form of 7-bit bytes is processed by instructions stored in a random access memory 18 by means of an interconnecting data bus 20. The random access memory 18 stores the keystroke data bytes in addition to instructions for operation of the processor 10.

Also connected to the random access memory 18 by means of a data bus 22 is a display refresh buffer 24 that receives display data for formatting a visual presentation on a display screen 26. Control signals for operation of the display screen 26 are provided along a data bus 28.

Typically, the display screen 26 is a cathode ray tube, and in a preferred embodiment of the present invention, was formatted into four virtual images, the major one of which displayed twenty lines of text information. The total line capacity of the display was twenty-five lines with the first line reserved as a virtual display for document formatting information and the bottom two lines of the display reserved for virtual images as a prompt line and a message line to give an operator instructions on the control of the text processing system of FIG. 1.

Figure 2:
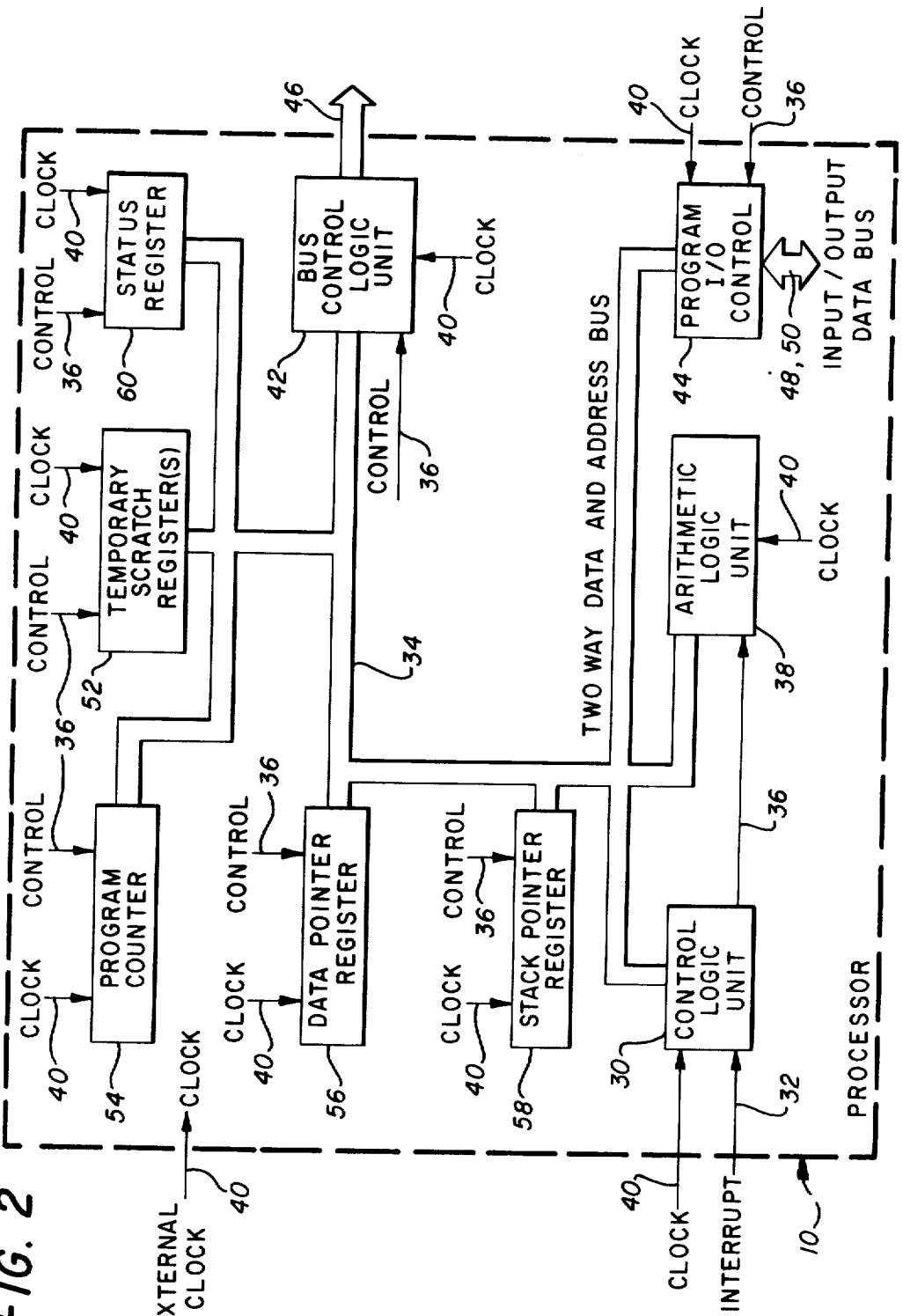
FIG. 2 is a block diagram showing logic hardware detail of the processor of FIG. 1 with interconnecting control and data bus paths.

Referring to FIG. 2, the processor 10 is further detailed to show typical logic hardware elements as found in such processors. The processor may be a commercially available unit, such as from Intel Corporation and identified by the Number 8086. Typically the processor includes a control logic unit 30 which responds to interrupts on a device bus 32 from the keyboard 16. The control logic unit 30 is also connected to the data and address bus 34 interconnected to various other logic units of the processor 10.

In response to a fetch instruction from the random access memory, the control logic unit 30 generates control signals to other logic elements of the processor. These control signals are interconnected to the various elements by means of a control line 36 which is illustrated directly connected to an arithmetic logic unit 38 and identified as a "control" line 36 to other elements of the processor. Synchronous operation of the control unit 30 with other logic elements of the processor 10 is achieved by means of clock pulses input to the processor from an external clock source. This instruction bus is also shown interconnected to other logic elements of the processor detailed on FIG. 2.

Data and instructions to be processed in the processor 10 are input through a bus control logic unit 42. Data to be processed may also come from program input/output control logic 44. The bus control logic 42 interconnects storage elements of the random access memory 18 and receives instructions for processing data received from the input/output control 44 or received from the random access memory. Thus, the input/output control 44 receives data from the keyboard 16 or the random access memory 18 while the bus control logic 42 receives instructions and/or data from the same memory. Note that different storage sections of the random access memory are identifiable for instruction storage and data storage.

Device control information from the processor 10 is output through the program input/output controller 44 over a data bus (12, 20). Input data on the data bus (12, 20) from the keyboard 16 is processed internally through the processor by instructions on the bus 34 to the scratch register 60. The arithmetic logic unit 38 in response to a control signal on line 36 and in accordance with instructions received on the memory bus 46 performs arithmetic computations which may be stored in temporary scratch registers 52. Various other transfers of data between the arithmatic logic unit 38 and other logic elements of the processor are of course possible. Such additional transfers may be to a status register 60, a data point register 56 or a stack pointer register 58. Also in the data stream for these various logic elements by means of the bus 34 is a program counter 54.

A particular operating sequence for the processor 10 is determined by instructions and data on the memory bus 46 and input data on the bi-directional bus (12, 20). As an example, in response to received instructions, the processor transfers data stored in the scratch registers 52 to one of the registers 56, 58 or 60. Such operations of processors as detailed in FIG. 2 are considered to be well known and understood by one of ordinary skill in the data processing field. A detailed description of each operation of the processor of FIG. 2 for the described invention would be counterproductive to an understanding of the invention as claimed.

Referring to FIG. 3, there is shown one operational format of the random access memory 18 that includes storage locations defining the display refresh buffer 24. In FIG. 3 the keyboard 16 is shown with the data bus 12 connected direct to the processor 10 while the control bus 14 is connected through an interrupt arbitrator 15 to the processor. The interrupt arbitrator 15 is logic hardware that receives all system interrupts and processes them on a priority basis to the control logic unit 30 of the processor 10. For purposes of describing the present invention directed to multi-directional motion of a cursor on the display screen 26, only the keystroke interrupt will be considered.

As formatted, the random access memory 18 includes a keystroke access memory 60 made up from defined storage locations. It should be understood that each of the identifiable areas of storage in the random access memory 18 comprise storage locations addressable by conventional techniques. Thus, the keystroke access memory 60 receives keystroke data bytes over the data bus 20 which is also connected to an application program memory 62. Stored in the application program memory 62 are application programs consisting of instructions and data bytes transferred between the application program memory 62 and a text storage buffer 64 or a display control block memory 66. As the name implies, the text storage buffer (TSB) 64 contains a data stream of unformatted text. Each byte in this data stream is either a graphic item (that is, letters, numbers, etc.) of single byte length, a single byte control instruction (that is, a line end, tab stop, carriage return, etc.) or a multi-byte control code. A multi-byte control code is a string of data "N" bytes long that contains information on how to format the data stream in the text storage buffer. Typical of multi-byte control codes are "left" and "right" margin settings, tab stops, character pitch, etc. Thus, the text storage buffer 64 is that area of the random access memory 18 that contains the data stream, part or all of which is to be formatted on the display screen 26.

That area of the memory 18 identified as the display control block 66 receives data and instructions from the applications program memory area 62 to generate formatting instructions to a display access method (DAM) program 68. To provide these formatting information instructions, the results of an input/output search are passed between the display control block and the DAM program 68 by means of an instruction bus 70.

Also received by the display access method program 68 are graphic bytes and control bytes from the text storage buffer 64 on a data bus 72.

In response to instructions from the display control block 66, the display access method program 68 formats the data from the text storage buffer 64 for inputting to the display refresh buffer 24 over the data bus 22. Also required for formatting of a display by the DAM program 68 is display information stored in a format storage area 74 which data is transferred between the DAM program 68 and the storage 74 by means of a data bus 76.

By operation of the random access memory 18 in conjunction with the processor 10, in the manner to be described with reference to FIGS. 4–17, a presentation of text is made on the display screen 26 that includes a cursor at a location defined by operator keystrokes.

Typically, the random access memory 18 contains instructions and data stored therein at various address locations. Instructions are loaded into the random access memory 18 for formatting the address locations to perform the function identified to the system. Alternatively, the random access memory may be replaced entirely by a combination of hard wired logic which would also replace the processor 10 such that "instructions" and the processor are not utilized. The flow diagrams described hereinafter will enable any person having skill in the art of logic design to specify hardware logic in accordance with the concepts of the claimed invention. These flow diagrams will also enable anyone having skill in the art of computer programming to program a general purpose digital computer to perform the functions described, that is, multi-directional movement of a cursor on the display of a text processing system.

Prior to continuing with the description of the figures describing multi-directional cursor motion, certain terms need to be defined to assist in an understanding of the invention.

DEFINITIONS

1. TEXT STORAGE BUFFER (TSB) is the area 64 in the random access memory 18 that contains the data stream, all or part of which is to be formatted on the display screen 26.
2. CONTEXTUAL CURSOR ADDRESS (CCA) is the address in the data stream that the operator perceives as an edit point, this address can be any place within the defined boundaries of the text storage buffer.
3. CURSOR LINE ADDRESS (CLA) is the text line starting address on which is found the contextual cursor address.
4. WINDOW TOP ADDRESS (WTA) is the text line start address which is the first line of text on the display screen 26.
5. LEFT PAPER EDGE (LPE) is the left edge of a paper upon which the text in the text storage buffer will be printed.
6. TEXT LEFT MARGIN (TLM) is the number of white character spaces from the left paper edge to the first position for graphic display on a line of displayed text.
7. SCREEN WIDTH (SW) is the number of character boxes (spaces) on a horizontal line of the display screen 26. This is also identified on occasion as display size (DS).
8. TEXT TUBE LEFT (TTL) is the number of character spaces from the left paper edge, that is, the first character position at the left edge of a line of text on the display screen 26.
9. SPATIAL CURSOR (SC) is the (X) and (Y) position on the display screen 26 of the contextual cursor address as perceived by the operator where Y is the number of lines down from the top of the display and X is the number of character boxes from the left edge of the display area.
10. DELTA X ($\Delta X$) is the left or right spatial difference from the present X position to a new spatial position the operator identifies by keystroke entry.
11. DELTA Y ($\Delta Y$) is the up or down spatial difference from the present Y position to a new spatial position identified by the operator for a keystroke entry.
12. ESCAPEMENT CHARACTER COUNT (ECC) also DISPLAYABLE CHARACTER COUNT (DCC) is the number of displayable character positions from the left paper edge through the contextual cursor address for the line on which the cursor appears.
13. LINE END COUNT (LEC) is the number of line ends processed from some starting address to a stopping point.
14. HORIZONTAL SHIFT (HS) is a predefined number added to or subtracted from the text tube left as utilized by the segmentation subroutines to look for the segment of the text line to be displayed such that the spatial cursor can be displayed.

As a further explanation prior to proceeding with description of FIGS. 4–17, it should be pointed out that the display screen 26 does not necessarily include all the text data in the text storage buffer 64. Only a limited number of text lines will be displayed whereas the total number of text lines may often exceed this number. Further, text line lengths stored in the text storage buffer 64 may exceed the number of character boxes available on the display screen 26. Multi-escapement character count and the line end count are used to support the vertical segmentation and horizontal segmentation to enable the formatting of data to fit within the display screen outline limitations. The term horizontal shift (HS) also relates to the ability to segment the display in a horizontal direction. When a horizontal shift is required, a new display will contain about 25% of the previous display, although a greater or lesser percent of the overlap is acceptable. Again, in one implementation of a text processing system incorporating the present invention, the display screen 26 is 80 character boxes wide and a segmentation will overlap twenty characters of the previous display on the new display.

Figure 4:
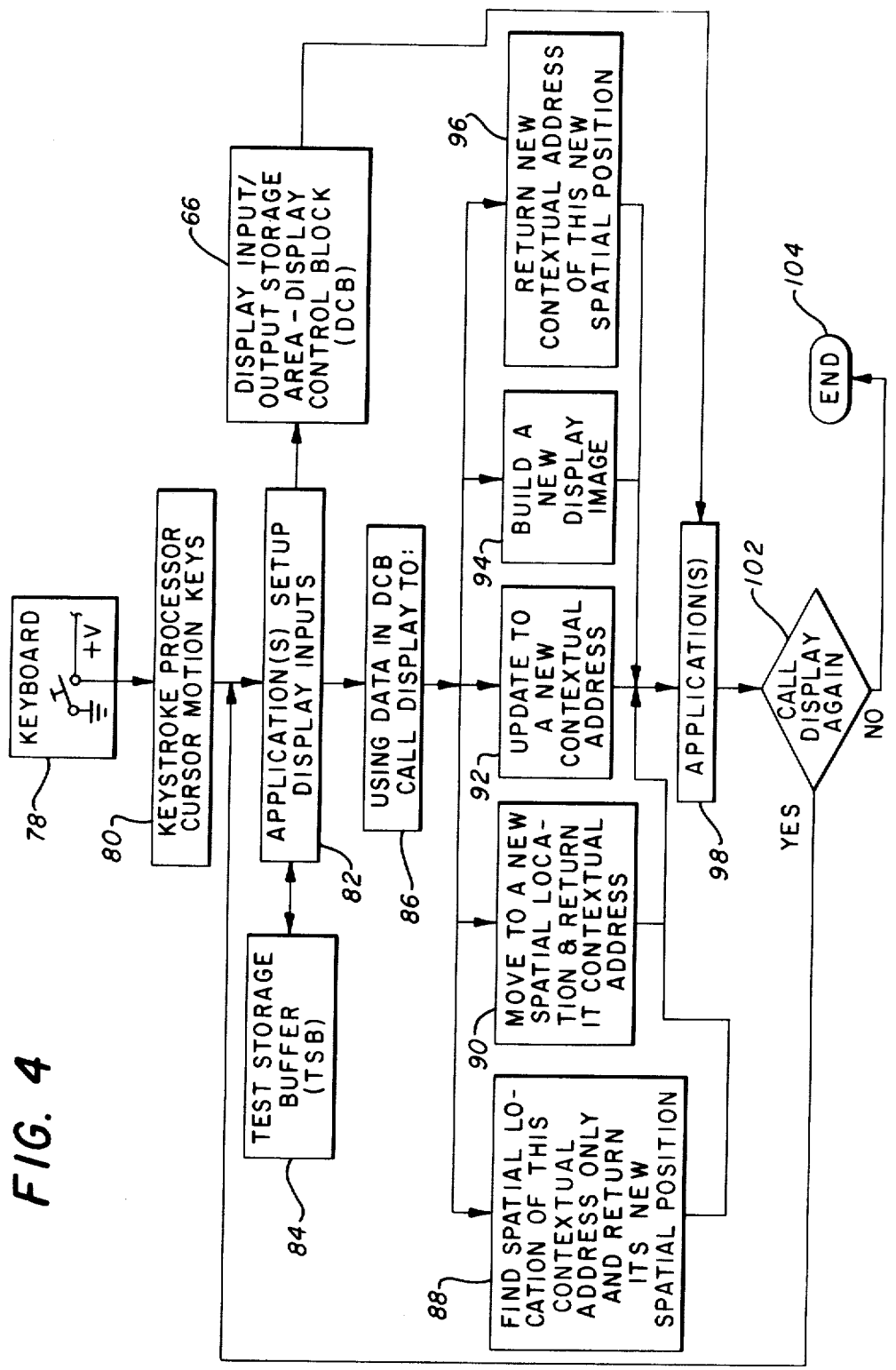
FIG. 4 illustrates operation of the processor of FIG. 1 with instructions from storage and data in the display control block to build, update, move, determine a spatial position for a new contextual address, or determine a contextual address for a new spatial position.

Referring to FIG. 4, there is shown a flow chart of the operation of the DAM program 68 for displaying text on the display screen 26. An operator inputs keystroke data at 78 to establish a cursor position in either the vertical or horizontal position displaced from the present cursor position on the display screen 26. This cursor keystroke is processed into a spatial cursor position to identify a new cursor spatial location on the display screen 26. The keystroke is processed in the processor 10 at 80 and input into the keystroke access memory 60. An application set-up is selected at 82 which for purposes of the description of the present invention will be defined as a text application. The various application programs are called by a command from the applications program 62 in response to an interrupt. Other application programs for display include a "menu" application, multiple virtual image displays, and a diagnosis application. The X-Y cursor application is selected from the application program 62 that calls the DAM program 68. The DAM program 68 retrieves instructions from the display control block 66 and for a text display looks to the text storage buffer at sequence 84 to provide graphic and controlled data bytes.

After retrieving data from the text storage buffer 64, the display access method program 68 receives data from the display control block 66 and calls one of several subroutines by a call from control block 86. One of the subroutines to be called is a CONSP subroutine 88 and is run to find the spatial location of the contextual address and return a new contextual address for the new spatial position of the cursor to storage. Another subroutine 90 that is available to be called is identified as a "MOVE" and during the running of this subroutine the display access method program 68 converts a spatial location, relative to a current spatial cursor position, to its contextually equivalent location. This subroutine is called to resolve a contextual pointer position and receives a spatial location as an input and outputs the corresponding contextual location. Still another possible subroutine called by the DAM program 68 at control block 86 is identified as an "UPDATE" subroutine 92. This subroutine provides instructions for operation of the display access method program 68 to update the textual display starting with the line on which the cursor presently appears on the display screen 26. During this subroutine the display access method program 68 reformats the identified line and performs horizontal or vertical segmentation as required.

The primary subroutine that is called by the control block at 86 is used not only for cursor movement but for other applications of the text processing system and is identified as a "BUILD" subroutine 94. The BUILD subroutine provides data and instructions to format the display using the unformatted data from the text storage buffer 64. This subroutine is run to return the display screen 26 to a prior state, for example, following the return from a menu display; initially format text, for example, entry by an operator to revise text on a page; or to format text which has been changed, for example, following a "boundary" key. Primarily the BUILD subroutine is run when the text from the text storage buffer 64 has changed such that the prior image is obsolete. Input to the build subroutine for cursor motion, as will be described, is the contextual cursor with an output representing the corresponding spatial location.

One additional subroutine that may be called by the DAM program 68 at the control block 86 is identified as a CONCT subroutine 96 and provides data and instructions to determine a contextual address for a new spatial location relative to the current spatial cursor. This subroutine receives the contextual location as an input and outputs the corresponding spatial location.

Following the return of any of the subroutines 88, 90, 92, 94 or 96 to the routine of FIG. 4 an application check 98 is made on the output data in the display control block, as represented by the block 100, to again run the DAM program 68. The program call may be for one of the discussed subroutines for cursor motion, or another operation of the text processing system. At test is made at 102 to determine if the display program is to be called again by the application set-up 82, or if the program is to step to an end at 104.

Figure 5:
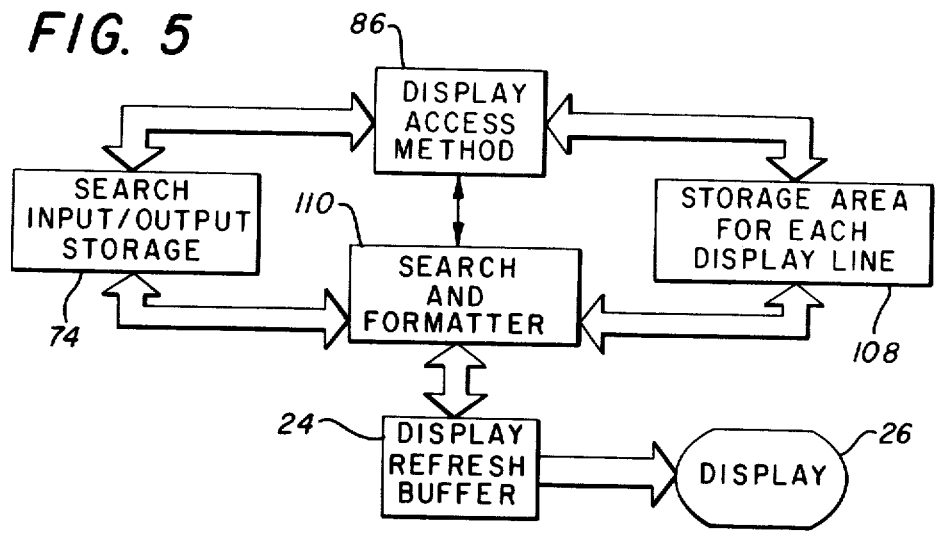
FIG. 5 illustrates a display access method program for building a new display image, updating or moving a cursor display by means of changing data in a refresh buffer.

Referring to FIG. 5, there is shown the data flow paths when the display access method program 68 runs any of the subroutines 88, 90, 92, 94 or 96. Data flows between the main display routine and the search and format routine 110 from memory storage areas 74 and 106 as part of the DAM program 68. Data formatted by the routine 110 is placed in the refresh buffer 24 and passed to the display screen 26. Storage area 106 contains input/output data for routine 110 and storage area 74 contains saved display line data. Data stored in the areas 74 and 106 are used in response to one of several search routines, "0101" search, "0102" search, or "0103" search. These search subroutines will be detailed later in the description.

To effect a cursor motion on the display screen 26 data input to the storage areas 74 and 106 includes the start address in the text storage buffer for the search to be run. Also required as inputs by the search subroutines are the text left margin of the start address and the text tube left position. The horizontal or "X" position of the cursor must be input along with the number of line ends to be processed in the search. To run the search subroutines the stop address of the search in the text storage buffer must be input along with the address of the contextual cursor. Finally, the search subroutines receives as an input the start line number of the display.

To generate a cursor display there is output from the search subroutines, the number of line ends to be processed along with the address of the first byte after the last line end that was processed. Also output from the search subroutines is the text left margin for the first byte after the last line end processed and the new contextual cursor address based on the text tube left position and the X position of the cursor. Additional output data from the search subroutines includes the number of displayable character positions from the left page edge through the contextual cursor address for the text line on which the cursor appears. Additional output data defines the white space indicators or text free area of the display screen 26.

Figure 6:
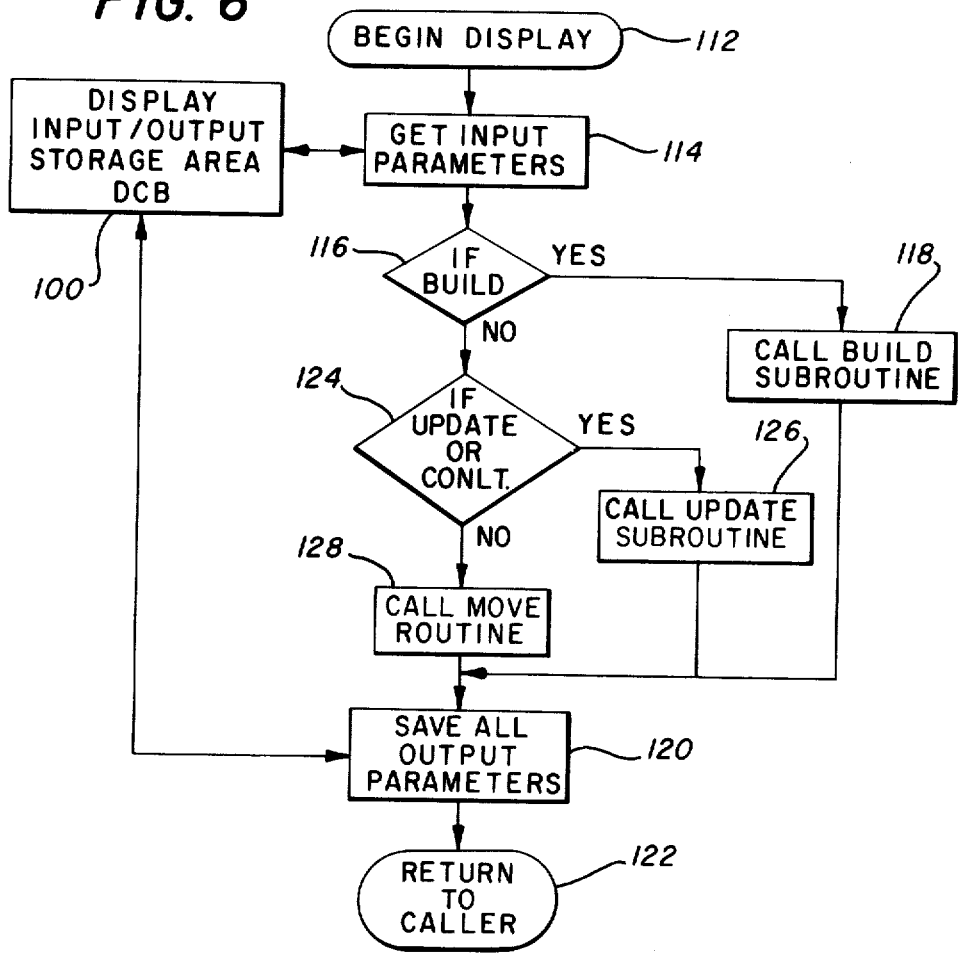
FIG. 6 illustrates an operation for selecting one of several subroutines called for displaying text on a screen where the text includes both characters and instructional information screen formatting.

Referring to FIG. 6, when an applications interrupt occurs as the result of a keystroke the DAM program 68 is called and runs the illustrated routine which is called at 112 from the control block 86. Initially input parameters are obtained at 114 from the display input/output storage area of the display control block 66 and test 116 is made to determine if the build flag has been set. When the control block 86 calls the "BUILD" display subroutine then it is called at 118. Upon completion of the BUILD subroutine 118 all output parameters are saved at 120. The output parameter are transferred to the display input and output storage area 66 and the display routine returns to the caller at 122.

If the BUILD subroutine is not identified as being called at test 116, then a test 124 is made to determine if the control block 86 is calling for a display update which calls the UPDATE subroutine at 126. Another subroutine that may be called at 126 is the CONCT subroutine for converting the contextual location of the cursor to a spatial location. This is essentially an UPDATE subroutine with no update of the display data or the display control block parameters describing the current screen. This subroutine is called by the applications program 64 to resolve spatial pointers prior to a move subroutine. Upon completion of the UPDATE subroutine, or the CONCT subroutine all the output parameters are saved at sequence 120 in the display input and output storage area 66. The DAM program 68 returns operation of the memory 18 to the applications program 62.

If neither the UPDATE or CONCT subroutines are to be called at sequence 124, then the routine of FIG. 6 calls the MOVE subroutine at sequence 128 and upon completion of this subroutine output parameters are saved at sequence 120 in the display input and output storage area 66. Again, control of the memory 18 returns to the applications program 62.

Figure 7B:
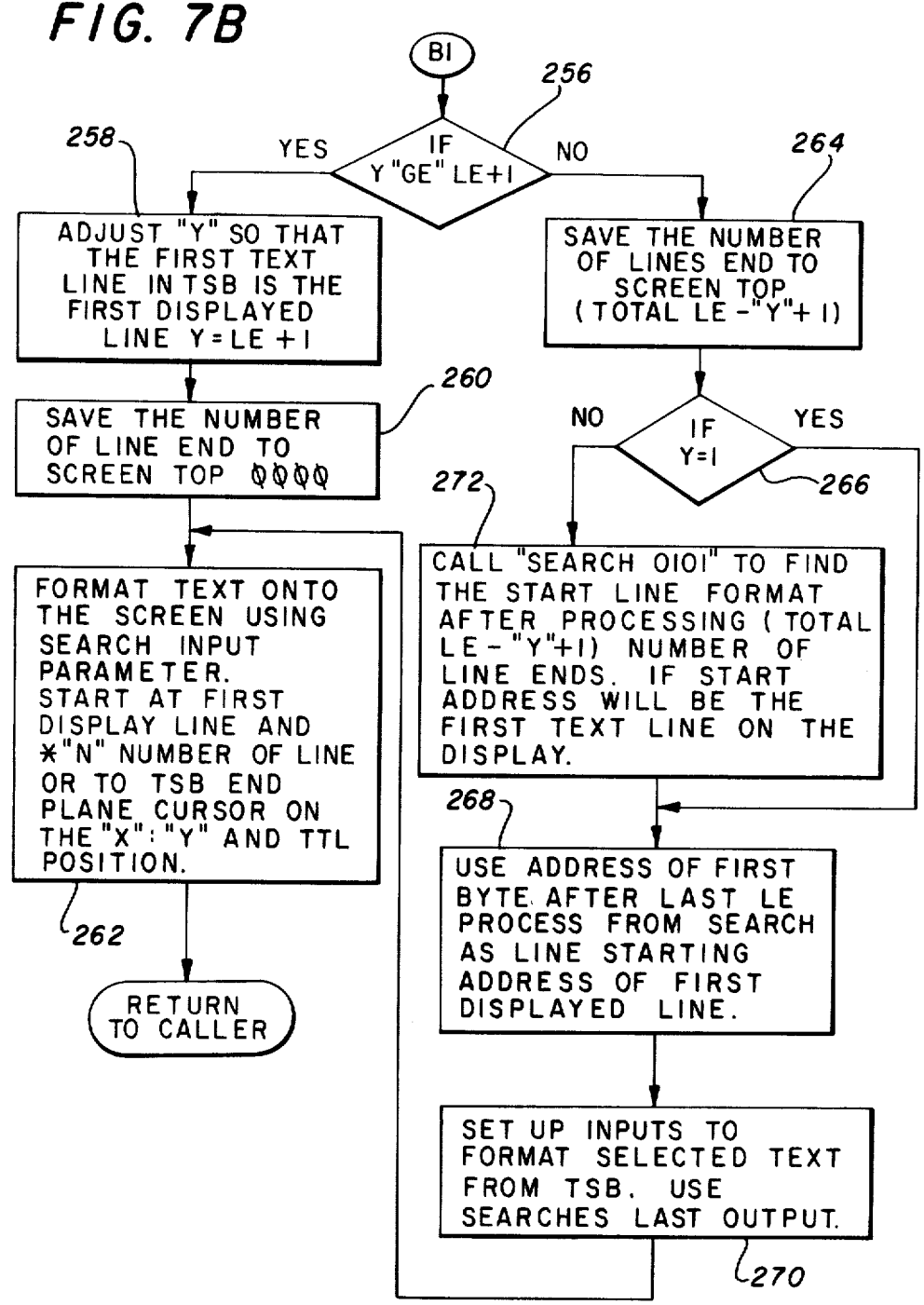

Considering next each of the subroutines to be called by the running of the routine of FIG. 6, FIGS. 7A and 7B illustrate the operation of the DAM program 68 when a build of the display is required. The BUILD subroutine is called by a command 130. Upon entering the build subroutine, first inputs are set up at sequence 132 for a search to find the contextual cursor address, which is in the text storage buffer 64, and saved parameters from the input/output search area 106. After setting up the inputs for the search the BUILD subroutine calls a "0101" search subroutine 134 to find the starting line format for the stop address.

Figure 8:
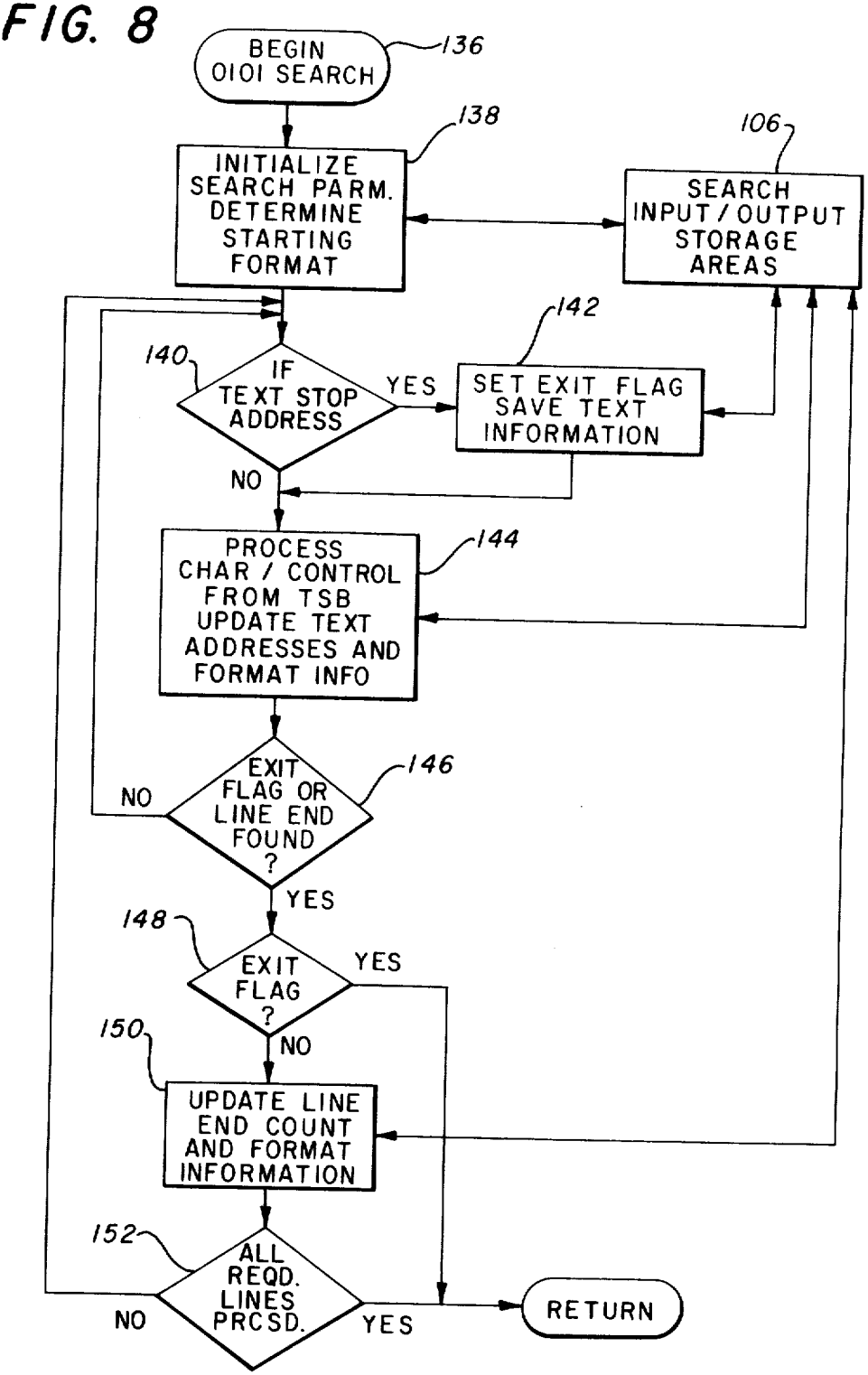
FIG. 8 illustrates an operation as a search subroutine called during the servicing of the subroutine of FIGS. 7A and 7B building a display image.

Referring to FIG. 8, there is shown a flow chart of the 0101 search subroutine which is called by a command 136. First search parameters are initialized at sequence 138 to determine the starting format from data in the search input/output storage areas 106. Data retrieved from the data storage area 106 for initializing search parameters at sequence 138 includes the text start address, the text left margin of the start address and the number of line ends to be processed. Further, the stop address in the text storage buffer is searched at sequence 138. These various inputs are retrieved from the storage area 106 during the running of the 0101 search subroutine.

After initializing the search parameters at sequence 138 a test 140 is made of the text stop address and if found sets the exit flag and saves the text information at sequence 142. If the test 140 does not find a text stop address or when the exit flag is set at sequence 142, the subroutine of FIG. 8 processes character and control data from the text storage buffer to update text addresses and format information during the sequence 144. A test 146 is made to determine if the exit flag has been set or if a line end has been found. If neither of these events has occurred, the loop will return the subroutine to the test 140. When either of these events has occurred, then a test 148 is made to determine if the exit flag has been set. If set, the subroutine steps to return to the subroutine of FIGS. 7A and 7B at sequence 134.

When the exit flag has not been set the 0101 search subroutine updates the line end count and format information at sequence 150 in the search area 106. Upon completion of this updating and formatting a test 152 is made to determine if all the required lines have been processed. If not, then the loop recycles to test 140 and continues until all required lines have been processed at which time the subroutine is completed and returns to the sequence 134 of FIGS. 7A and 7B.

Upon completion of the subroutine of FIG. 8 data available for further processing includes the number of line ends processed, the address of the first byte after the last line end processed and the text left margin.

Returning to the build subroutine of FIGS. 7A and 7B, upon completion of the 0101 search subroutine the total number of line ends processed is saved at sequence 154 and then a "Segment-CL-CCA-Known" subroutine 156 is called to determine the X position and the text tube left values so the contextual cursor address can be displayed.

Figure 9A:
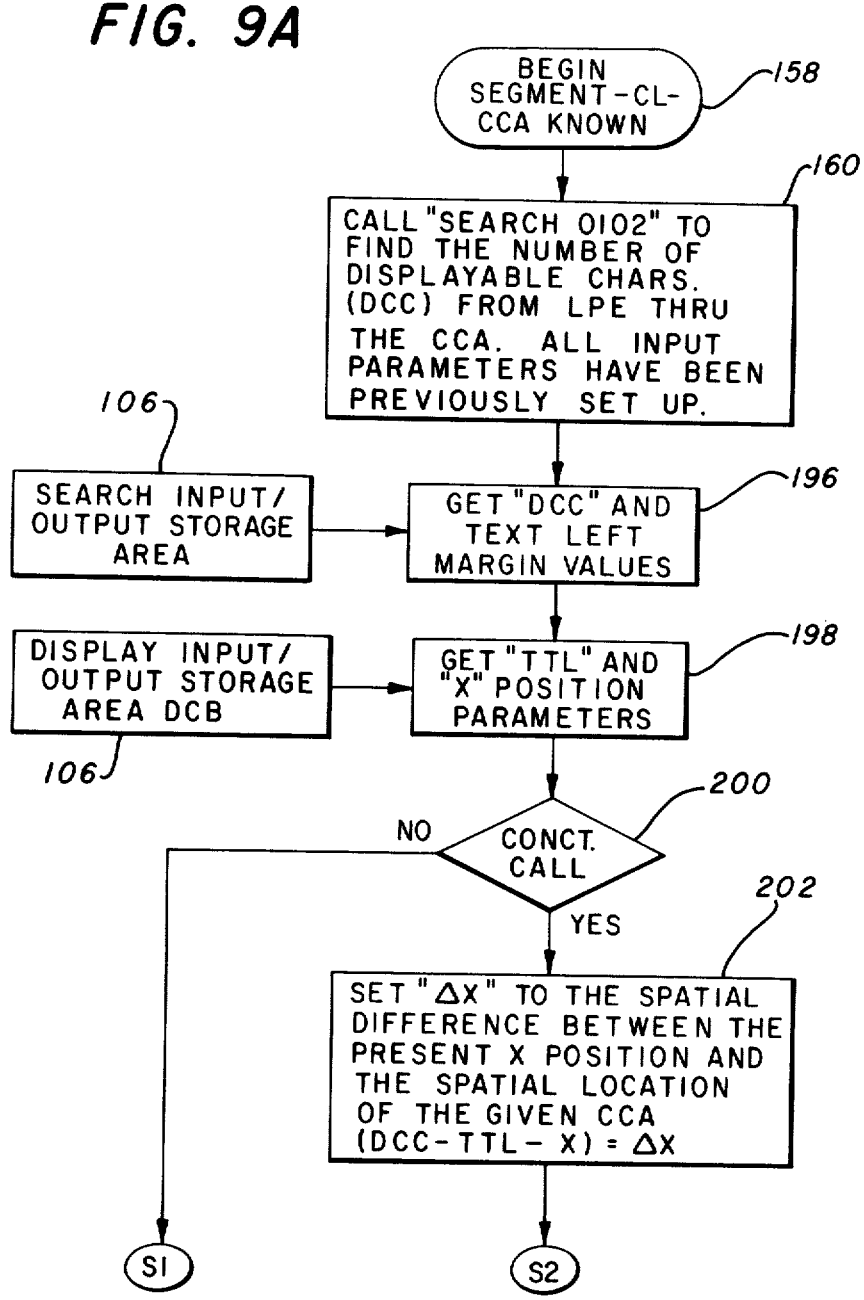
FIGS. 9A, 9B and 9C illustrates another operation as a subroutine called during the servicing of the sequence of FIG. 6 to update display information in a refresh buffer.
Figure 9B:
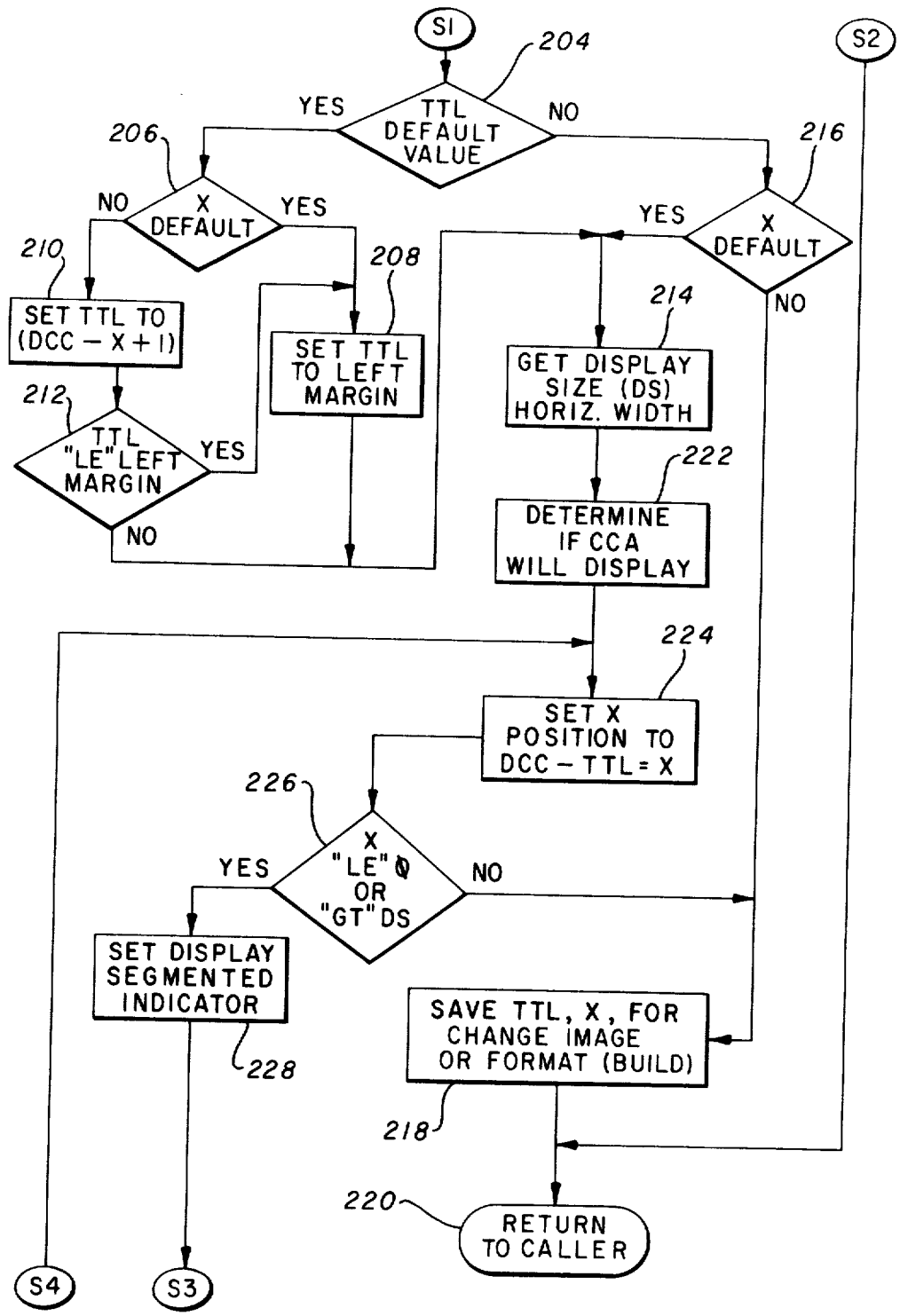
Figure 9C:
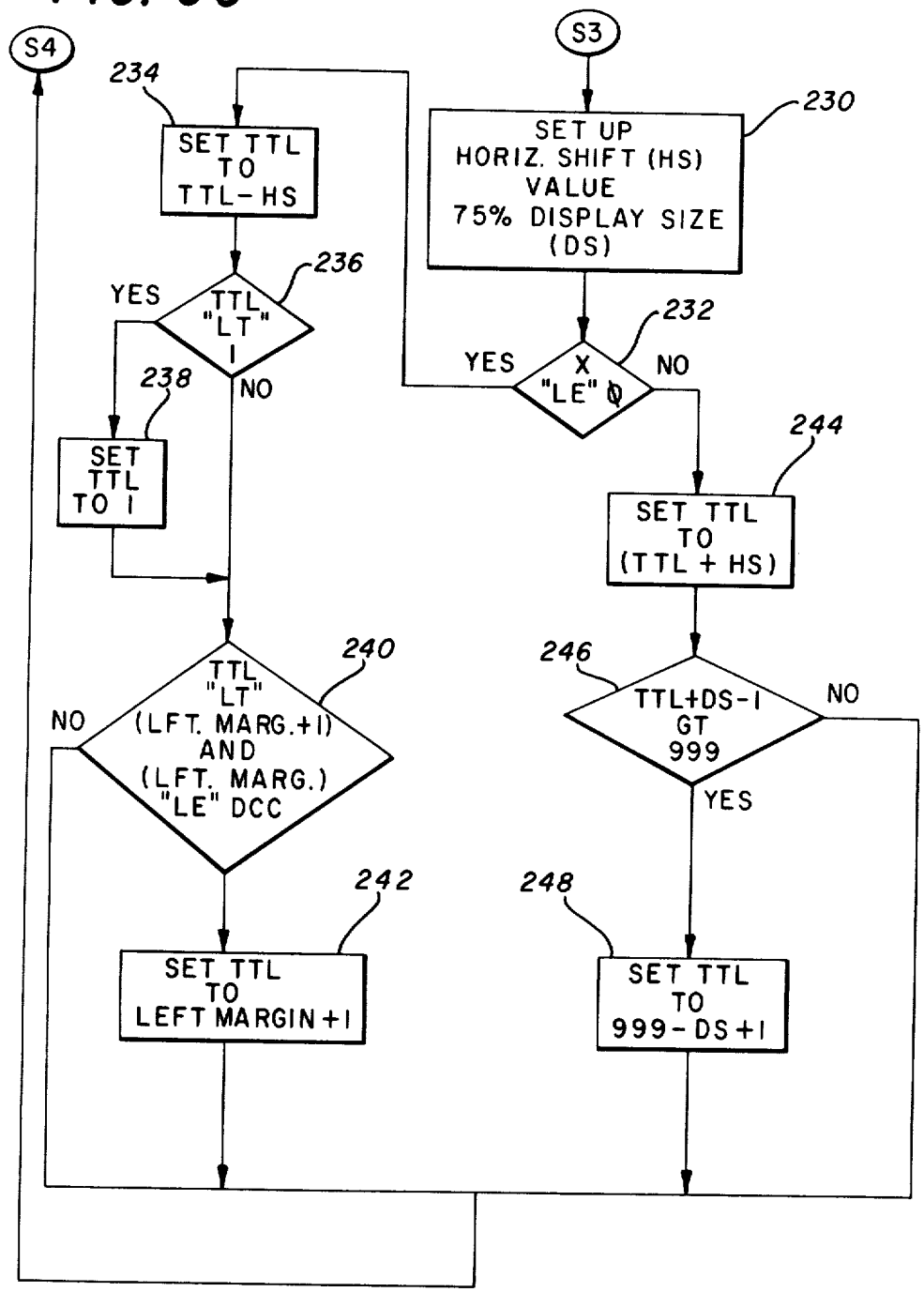

Referring to FIGS. 9A, 9B and 9C, there is shown a flow chart for the subroutine 156 which is entered at command 158. Upon entering the subroutine 156 a 0102 search subroutine 160 is called to find the number of displayable characters from the left page edge through the contextual cursor address from input parameters that have been previously set up.

The routine of FIGS. 9A, 9B and 9C is used to determine what portion (segment) of the cursored line is to be displayed so that the spatial coordinates of the contextual cursor address are displayed. This subroutine is required because the display screen 26 may not include all the characters on a text line. That is, the width of the document stored in the text storage buffer 64 may exceed the width of the display screen 26. Thus, the segment display represents the number of characters on a line of the display screen 26, that is, the display size.

Segmentation of the display is limited on the left to the text left margin plus one character count or the left paper edge, if there is text stored to the left of the margin. Segmentation is limited on the right to 999 character positions from the left paper edge. In the segmentation as described the first character position (text tube left) is adjusted by 75% of the display size, a horizontal shift, until the contextual cursor address spatial position will be displayed.

Figure 10:
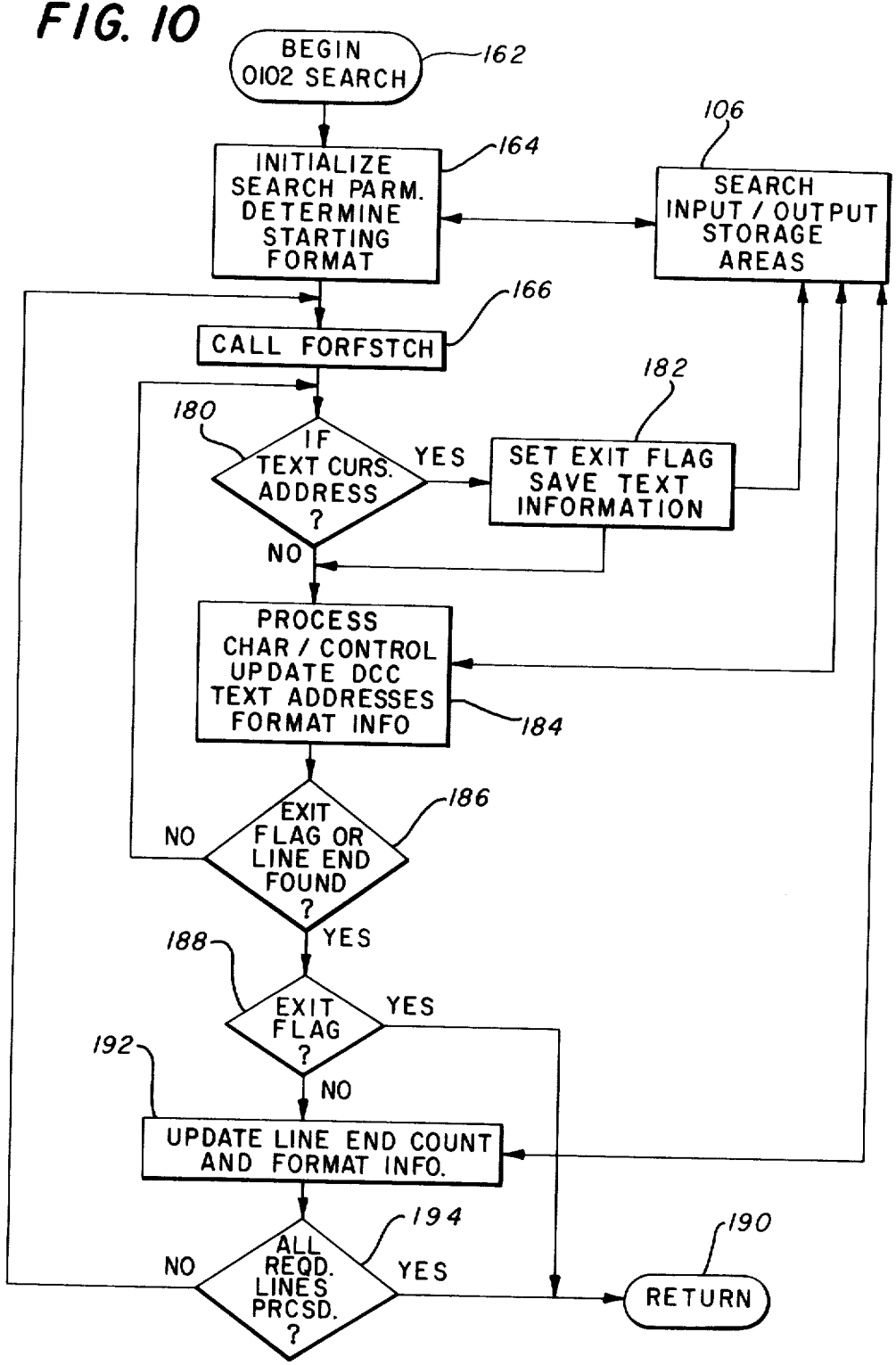
FIG. 10 illustrates an operation as a search subroutine called during the servicing of the subroutine of FIGS. 9A, 9B and 9C to determine display segments when the address of a contextual cursor is known.

Referring to FIG. 10, there is shown a flow chart for the 0102 search subroutine 160 which is entered at command 162 to find the displayable character count given a contextual cursor address. The 0102 search subroutine is a search of the cursored character line the format information of which has been previously provided by the 0101 search subroutine of FIG. 8. Upon entering the 0102 search subroutine first search parameters are initialized at 164 to determine the start format of data in the input/output storage area 106. The search is from the text storage buffer 64. Upon completion of initialization at 164, a subroutine for initializing line start parameters is called at sequence 166. This subroutine is illustrated by the flow chart of FIG. 11.

Figure 11:
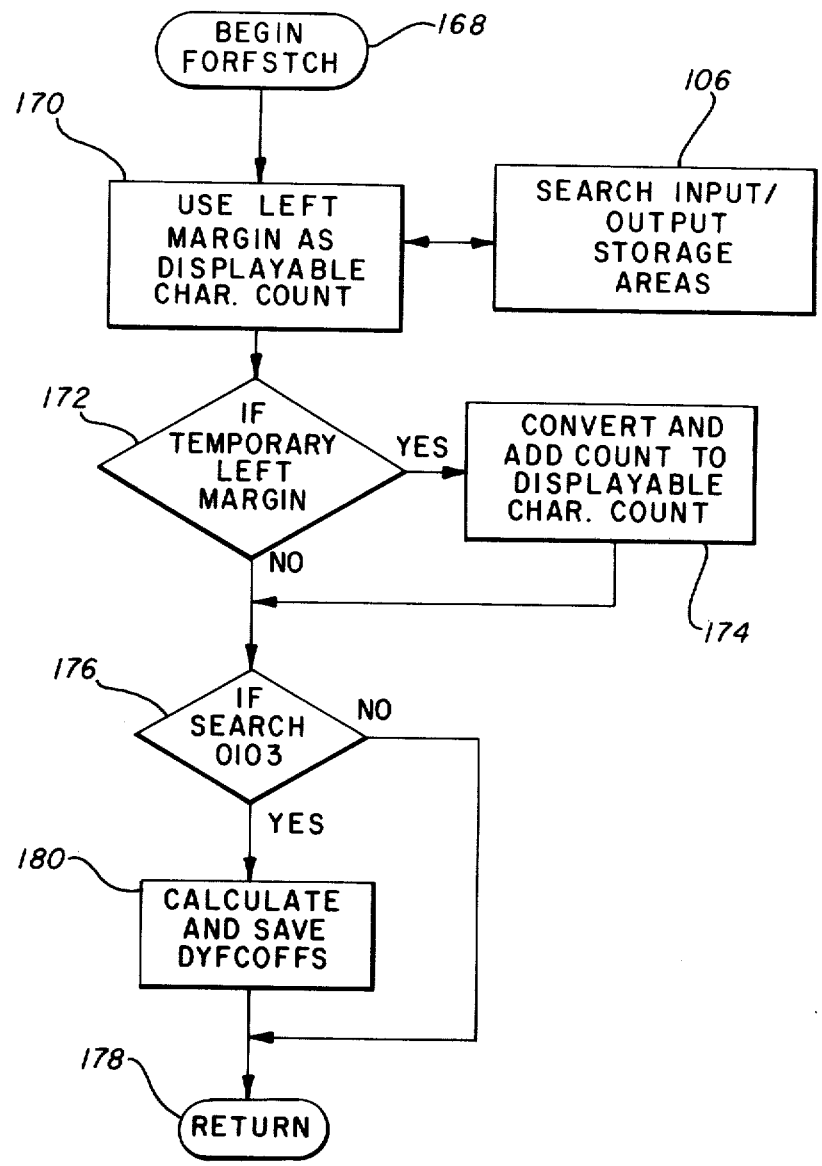
FIG. 11 illustrates an operation as a subroutine called during the servicing of the subroutine of FIG. 10 using search input/output storage areas of memory.

Referring to FIG. 11, upon entering the formatter subroutine at a command 168 the left margin position retrieved from input/output storage 106 is used at sequence 170 as the number of displayable character counts. If there is a temporary left margin (e.g., an indent tab) as determined at a test 172 then a count is added to the displayable character count at sequence 174 and the formatter subroutine advances to determine if the command was called from a 0103 search subroutine at sequence 176. The test to determine if the formatter subroutine was called from a 0103 search subroutine is also made if there is not a temporary left margin as determined at test 172.

Since for this call the formatter subroutine of FIG. 11 was not entered from the 0103 search subroutine, the operation of the DAM program 68 returns at sequence 178 to the 0102 search subroutine of FIG. 10.

Returning to FIG. 10, upon completion of the formatter subroutine at 166 the 0102 search subroutine now has initialized line start parameters, and a test 180 is made to determine if the contextual cursored character is the one identified as the new cursored character/stop address. When the cursored character is that desired an exit flag is set at sequence 182 and the address of the cursored character is saved in the storage area 106 and the 0102 search subroutine advances to sequence 184. Instructions at sequence 184 process the character and control data to update the displayable character count, the text address and format information. This requires obtaining data from the storage area 106.

It should be noted that some of the controls as evaluated at sequence 184 bump the character count such as a tab stop, which bumps the character count by the next tab stop position on the line. There are also control codes that decrement the character count, such as required backspaces. The displayable character count data is input to the storage area 106 and includes the number of displayable characters found to get to the address of the cursored character. This character count is from the paper edge.

Upon completion of the updating of the displayable character count at sequence 184 a test 186 is made to determine if an exit flag has been set at sequence 182 or a line end has been found. When neither of these events has occurred, then the 0102 search subroutine returns to the test 180. If either has been found at the test 186, then a test 188 is made to determine if the subroutine has advanced because of the setting of the exit flag at sequence 182. If it has then the 0102 search subroutine is completed and returns at 190 to the subroutine of FIGS. 9A, 9B and 9C.

When the exit flag has not been set as determined by the test 188 the line end count and format information are updated at sequence 192 by addressing the storage area 106. After retrieving information at sequence 192 a test 194 is made to determine if all the required lines have been processed. If not, the 0102 search subroutine returns to call the formatter subroutine at sequence 166. When all required lines have been processed, the 0102 search subroutine returns at 190 to the subroutine of FIGS. 9A, 9B and 9C.

After completion of the 0102 search subroutine at sequence 160, the number of line ends processed, the address of the first byte after the last line end processed, the position of the text left margin and the number of displayable character positions from the left paper edge to the contextual cursor address is stored in the storage area 106. Upon return of the operation of the DAM program 68 from the 0102 search subroutine, the displayable character count and the text left margin and their values are retrieved from the storage area 106 at sequence 106. The text tube left value and the X position are then retrieved at sequence 198 from the display input/output storage area 106. After retrieving the necessary values and parameters, a test 200 is made to determine if the CONCT (convert contextual cursor address) is called. When the CONCT subroutine has been called the ΔX value is set at sequence 202 to the spatial difference between the present position of the cursor and the spatial location of the new contextual address. Thus, at sequence 202 the spatial difference between the present spatial position of the cursor and the spatial location of the given contextual cursor address is set. This is given by the formula $DCC - TTL - X = \Delta X$.

With the setting of the ΔX value the subroutine of FIGS. 9A, 9B and 9C returns to the subroutine which sets the command 158. In the present example, this was the build routine of FIG. 7.

When the test 200 produces a negative resative result, the segmentation routine of FIGS. 9A, 9B and 9C advances to the test 204 to determine if the text tube left is a default value. If it is, then a test 206 is made to determine if the X value is a default and when it is a default then the text tube left is set to the left margin plus one character count at sequence 208. If X is not a default, as determined by the test 206, then the text tube left is set at sequence 210 to the displayable character count minus the given X value plus one; this is given by the formula DCC−X+1. When the result of the setting of the text tube left at sequence 210 is less than the left margin, as determined at test 212, then the text tube left is set to the left margin plus one at sequence 208. This is a rule established because the text tube left position cannot be left of the left margin.

If the text tube left is not in a position left of the left margin as determined by the test 212, then a display size is obtained at sequence 214 to determine the display horizontal width. This calling of the display size is also made after setting of the text tube left to the left margin plus one at sequence 208.

Returning to the default test 204, if the text tube left is not a default, as found by the test 204, then a test 216 is made to determine if it is an X default. An X default advances the subroutine to a sequence to retrieve the display size at sequence 214. This sequence is also entered from sequence 208 and test 212. When the test 216 finds an X default, then the text tube left value and the X value are saved at sequence 218 for the change image subroutine or the build subroutine which is what issued the command for entering the segmentation subroutine of FIGS. 9A, 9B and 9C. Following sequence 218 program operation is returned to the DAM program 68 at return 220.

After the display size is obtained at sequence 214 then a test 222 is made to find if the contextual cursor address will be displayed. Next the X position value is set at sequence 224 to the displayable character count minus text tube left as given by the expression $DCC-TTL=X$. This is the new X position of the cursor and a test 226 is made to determine if it will be on the screen. The test is to determine if X is less than or equal to zero (LE≦0) or if the X position is greater than the display size (DS). When this test proves negative, then it is an indication that the X position from sequence 224 will be on the display screen 26 and the segmentation subroutine advances to sequence 218 to save both the text tube left and the X position data as explained, and the subroutine then returns to the caller at return 220. If the response to the test 226 is positive, then the X position will not be on the display screen 26 and segmentation, that is horizontal positioning, of the data must be performed.

When the X position is not on the screen, a segment display indicator is set at sequence 228 to set up an operation to define the horizontal shift parameter which, as explained, is 75% of the display size. This horizontal shift (HS) value is set at sequence 230 and a test 232 is made to determine if the X position is less than zero. When the X position is less than zero, the text tube left value is set to the present text tube left position minus the horizontal shift value as given by the formula TTL−HS. This new text tube left position is set at sequence 234 and a test 236 is made to determine if the new text tube left (TTL) value is less than one. If the new TTL value is less than one it is set to one at sequence 238 and a test 240 is made to determine if the new text tube left position is less than the left margin plus one character position and if the left margin is less than or equal to the displayable character count. The test 240 is also made when the new text tube left position is greater than one as determined at the test 236. If the test 240 gives a positive response, then the text tube left position is set to the left margin plus one at sequence 242 and the segmentation subroutine returns to set the X position to the displayable character count minus the new text tube left position at sequence 224. This path of the subroutine is also followed when the test 240 is negative.

Returning to the test 232 to determine whether the X position is less than or equal to zero, with a negative result the text tube left position is set to the old text tube left position plus the horizontal shift at sequence 244. This in effect adds 75% to the old value of the text tube left position. A test is then made to determine if a new text tube left position plus the display size minus one is greater than a value 999. This test 246 is made and if the formula TTL+DS−1 is less than 999, then the segmentation subroutine steps to set the X position at sequence 224. If the test given by the formula TTL+DS−1 is greater than 999, then a new text tube left position is set to equal 999 minus display size plus one character position as given by the formula 999−DS+1. This is set at sequence 248 and upon completion of this set of instructions the segmentation subroutine returns to set the X position for a cursor at sequence 224.

Any time the subroutine returns to sequence 224 a new X position of the cursor is determined by subtracting the new text tube left position from the displayable character count and the path through sequence 228 recycles until the test 226 proves negative. Whenever a negative result issues from the test 226 the X position of the cursor will be on the display screen 26.

Returning to FIGS. 7A and 7B, upon completion of the segmentation subroutine at 156, the build process advances to a sequence 250 to place the cursored line vertically. At the sequence 250, the cursored line is placed at a given Y position and in addition the starting line format of the first text line to be displayed is found. When the build subroutine is being run for an original build, then inputs have to be set up for the next 0101 search subroutine at 252. The next search, if required, will start at the beginning of the text storage buffer 64; if not required, the formatting of text to the refresh buffer 24 will start at the beginning of the text storage buffer. Where a previous build has taken place, the new build starts from the previous build which is determined by the number of line ends saved from the previous call. The total number of line ends saved is called at sequence 254 along with the given Y position and the line number. A test 256 is made to determine if the Y position is greater than or equal to the number of line ends saved plus one. This is given by the formula Y≧LE+1. If the result of the test 256 is positive, then the Y position is adjusted at sequence 258 to that the first text line in the text storage buffer 64 is the first displayed line, that is, $Y=LE+1$.

After adjustment of the Y position, the number of line ends from the text storage buffer start to the display screen top is saved at screen sequence 260 which on the initial build will be set to zero. After saving the number of line ends in storage the text is formatted at screen sequence 262 on the screen using parameters from the search subroutines starting at the first display line and continuing through the number of lines on the display or to the last text line stored in the text storage buffer 64. The cursor is placed on the X-Y position taking into consideration the text tube left position as previously established.

Returning to the test 256, if the given Y position is not greater than or equal to the number of line ends plus one, then the number of line ends to the display top must be determined. This is performed at sequence 264 where the number of line ends to the display top is saved where the value saved is given by the expression "Total LE−Y+1". Following the sequence 264 a test 266 is made to determine if the Y position equals one. If the Y position is equal to one, then the display format has been established, and the address of the first byte after the last line end processed is the line starting address of the first displayed line for use in formatting as processed at sequence 268. Inputs are now set up to format selected text from the text storage buffer 64 at sequence 270 and the build subroutine advances to format the text at sequence 262.

When the Y position is not equal to one as determined at the test 266, the 0101 search subroutine is called at command 272 to find a start line format. When calling the 0101 search subroutine at this time, the search is mase until a given number of line ends are processed to find a start line format. The total number of lines to be processed is determined from the formula Total LE−−Y+1. What is returned to the build subroutine at command 272 upon completion of the 0101 search subroutine is the address of the first byte after the line as determined by the previous expression. In addition the number of line ends processed will be returned to give the starting address of the first line on the display. Also returned from the search is the text left margin, all of which is needed to build text on the display screen 26.

Upon completion of the 0101 search subroutine as called at command 272 the build subroutine advances to the sequence 268 and through the set-up sequence 270 to the format sequence 262. Whenever the format sequence 262 is entered and completed the display access memory program 68 returns the random access memory 18 to the applications program 62.

In summary, to run the BUILD subroutine from the control block 86, a build command is input to the display control block 66 and passed to the DAM program 68. In addition the display control block 66 receives as an input a text storage buffer address and the length of the text storage buffer. Also input is the contextual cursor address and the X and Y position of the cursor as selected by operator keystrokes. The display control block 66 also receives as an input the text tube left position. When the build subroutine of FIG. 7 has been run to completion, there is output from the display control block 66 the X and Y position of the cursor on the display in addition to a text tube left position. The starting address of the cursored line is output along with the starting address of the first text line to be displayed on the first line of the display screen 26. The total line ends from the start of the text storage buffer 64 to the first displayed line is also output. In addition white space indicators are output along with boundary or segmentation error limits. These inputs and outputs pass between the display control block 66 and the DAM program 68 to format a display through the display refresh buffer 24 according to the outline of FIG. 5.

Figure 12A:
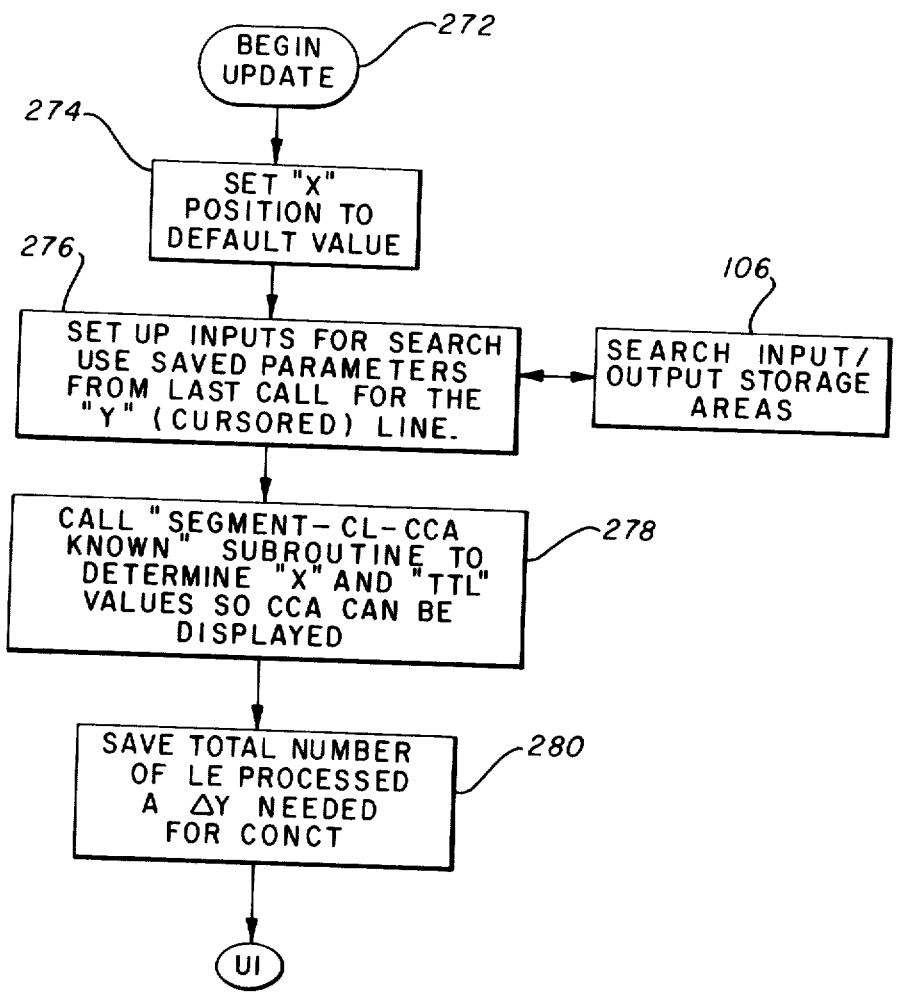
FIGS. 12A and 12B illustrates an operation of a subroutine called during the servicing the display routine of FIG. 6 for an update display operation.
Figure 12B:
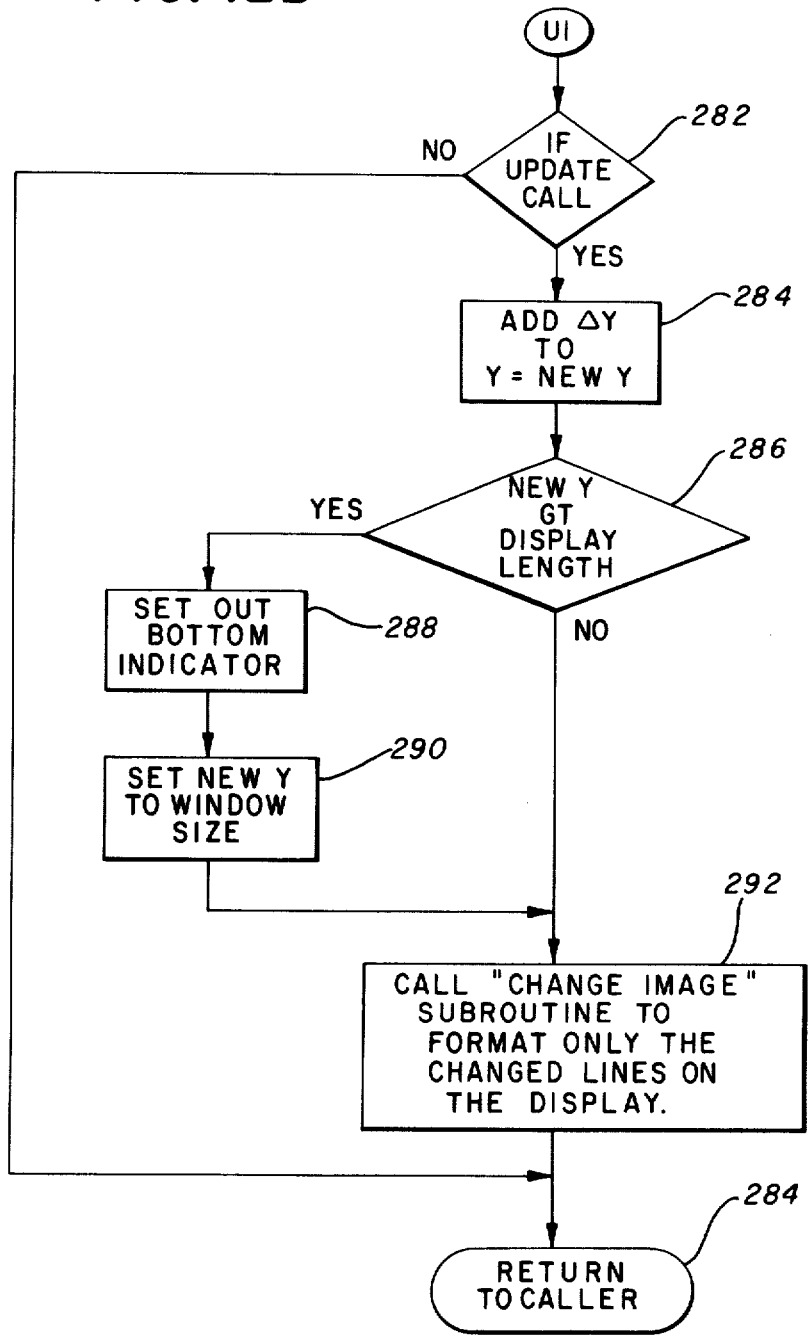

Referring to FIGS. 12A and 12B, there is shown an operation of the DAM program 68 when the control block 86 calls for the UPDATE subroutine 92 at a command 272. The X position of the cursor is set at sequence 274 to its default value as previously explained with reference to the subroutine of FIG. 9. Basically, the UPDATE subroutine is a subset of the BUILD subroutine as described with reference to FIGS. 7A and 7B.

Setting the X position to its default value at sequence 274 forces the subroutine of FIGS. 9A, 9B and 9C through a defined path. Next the inputs for a search are set up at sequence 276 using parameters saved from the last call for the cursored line. These values are stored in the storage 106 as a result of a previous BUILD subroutine which called the 0101 search subroutine to define the cursored line starting address and its left margin. Thus, for an update, the process starts based on data previosly stored from a BUILD subroutine. Whereas in a build subroutine the display may start from an unknown point, with an update the first line of the display is known.

Following the sequence 276 the seqmentation subroutine is called at command 278, the X position value of the cursor and the text tube left value are determined to enable the contextual cursor address to be displayed. The total number of line ends processed to the cursored line are saved at sequence 280. Following processing of the cursored line position to ΔY, a test 282 is made to determine if the call to the subroutine of FIGS. 12A and 12B was an update. If not, the routine of FIGS. 12A and 12B was called to find the spatial reference of a new contextual cursor. Thus a negative response to the test 282 advances the subroutine to a return 284 which is the completion of the subroutine 92.

When an update call is found at the test 282 then the new X position and Y position values of the new contextual cursor will be generated. Following the test 282, a new ΔY value is added to the previous Y value, that is, the cursored line, to provide a new Y value. Note, that the new X position has been set by the segmentation routine as run at command 278. When calling the subroutine of FIGS. 9A and 9B at command 278 for an update the test 200 of that subroutine is advanced to set the ΔX position at 202. Addition of the ΔY value to the previous Y value is completed at 284 and a test 286 is made to determine if the new Y position value is greater than the number of lines on the display screen 26, i.e., greater than the display length. If the new Y value is greater than the display length, then an out bottom indicator is set at sequence 288 which indicates that the new Y value is not on the display screen 26. With the out bottom indicator set the new Y value is set to the window size at sequence 290 and the cursored line will be the last or bottom line on the display screen 26. Essentially the top line of the display is rolled off by the display being vertically segmented.

If the new Y position is less than the display length or if it has been set to the window size at 290 then a change image subroutine is called at 292 to format only the changed lines on the display.

Figure 13B:
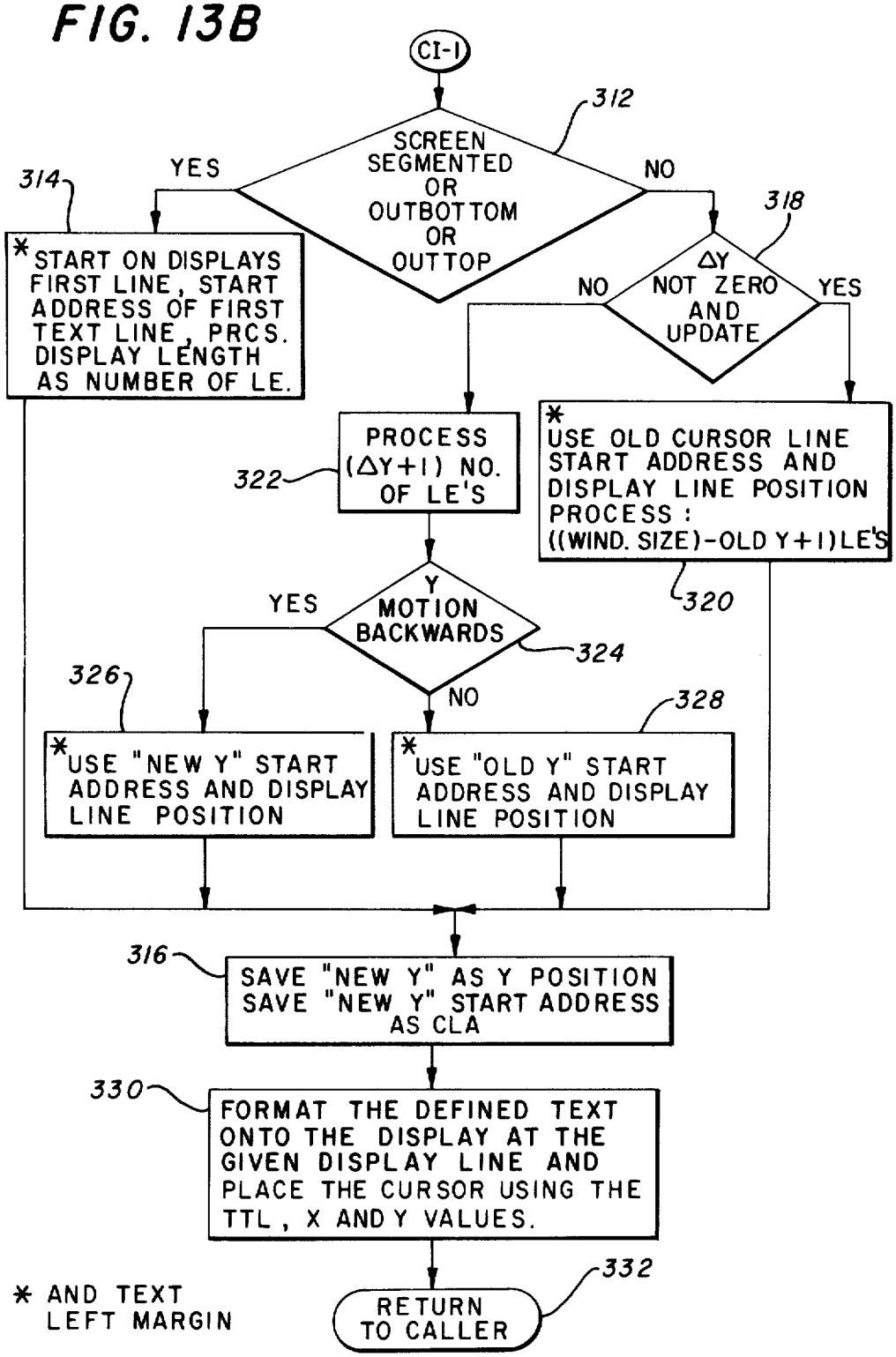

Referring to FIGS. 13A and 13B, there is shown the CHANGE IMAGE subroutine called by commnd 294. This subroutine defines a new image to be displayed with the starting contextual line address as the new display starting point. It determines the text starting line address, the first displayed line, and the text left margin as defined in sequence 296. The determination is made if the text starting line address is the first displayed line and also where is the text left margin. Next a test 298 is made to determine if the new Y line is out of the top or out of the bottom of the display screen limits. If either of the indicators at test 298 are on the result is that the entire display must be rebuilt. A test 300 is made to determine if the out of top indicator is on indicating that the address of the new text starting line is above the top line on the display screen 26. When the out of top indicator is on, the starting address of the last search call is used as the first text line start address at sequence 302. The text left margin address of the last search call is also used for a first text line. This first text line start address and the text left margin are saved at sequence 304. If the out of top indicator is not on, as determined by the test 300, the starting address of the first text line and the text left margin address are calculated at sequence 306 using the formula $Y + \Delta Y - \text{Window Size} + 1$. This gives the starting address of the first text line to be displayed. From the sequence 306 the first text line start address and the text left margin address are saved in storage at sequence 304.

If the test 298 indicates that neither the out of top nor out of bottom indicators are on then the current address of the text starting line and the text left margin address are retrieved at sequence 308 and saved at sequence 304. After saving the first text line start address and the text left margin address at sequence 304 an evaluation is made at sequence 310 to determine what displayed lines must be updated. To update display lines information required by the subroutine is the starting address of the lines to be updated, the address of the first line of the display, and the number of line ends to be processed in addition to the text left margin. This information is retrieved at sequence 310 for further processing.

Following sequence 310 a test 312 is made to determine if the display has been segmented or has gone out of the top or out of the bottom. If either of these events has occurred then updating of the display is started on the first display screen line using a previously defined starting address as the first text line of the display and the number of lines to process is determined by the display length. This display start is computed at sequence 314 and saved in storage at sequence 316.

When the screen has not been segmented and lines to be updated are not out of the top or out of the bottom of the display, then a test 318 is made to determine if $\Delta Y$ is not zero and the CHANGE IMAGE subroutine was called from an update call. When $\Delta Y$ is not zero and this subroutine call is the result of an update, the previous cursored line start address, the display line position and the text left margin address are used in a processing step 320. Proceeding to the step 320 means that a carriage return has been inserted in the middle of the text and previously stored data is used to process window size. Window size is computed by the formula "window size (WS) – previous $\Delta Y$ + one." The new data is saved at sequence 316.

When $\Delta Y$ is not zero, or if the subroutine of FIGS. 13A and 13B is called by a move subroutine call then the test 318 is negative and $\Delta Y$ plus one line ending is processed at sequence 322. Note, that at no time is there any evaluation made of where the old line is positioned on the display. Thus when $\Delta Y$ is zero, one line is processed at sequence 322 and a test 324 is made to determine if the motion in the Y direction is forward or backwards. When the Y motion is backwards, a new Y start address and display line position along with text left margin are used at sequence 326. However, if the Y motion was not backwards then the old Y start address, display line position and text left margin address is used at sequence 328. Whether proceeding through path 326 or 328, the new Y position is saved along with the new Y start as the cursored line address at sequence 316.

Next the CHANGE IMAGE subroutine formats and defines text lines on the display screen 26 at the given display line. Also the contextual cursor is placed on the display using the text tube left value and the X and Y position values. This formatting is completed at sequence 330. Following the formatting at sequence 330, operation of the DAM program 68 is returned to the caller at command 332 which in the present example was the UPDATE routine of FIGS. 12A and 12B. This also completes the UPDATE subroutine which returns the processor to the DAM program 68 at return 284.

In operation of the DAM program 68 with the display control block 66 when running the UPDATE subroutine, input data required includes the text storage buffer address and the text storage buffer length. In addition the contextual cursor address is input along with the Y position of the cursor. Also as a required input to run the update subroutine is the text tube left value and the start address of the cursored line. The start address of the first text line on the first line of the display screen 26 is input along with the total line end count from the start of the text storage buffer to the first displayed line.

Upon completion of the UPDATE subroutine, there is output to the display refresh buffer 24, the X and Y position of the cursor along with the computed text tube left value. The start address of the cursored line along with the start address of the first text line on the first display line is also an output to the display refresh buffer 24. White space indicators and boundary or segmentation error limits are also transferred to the display refresh buffer 24.

Figure 14A:
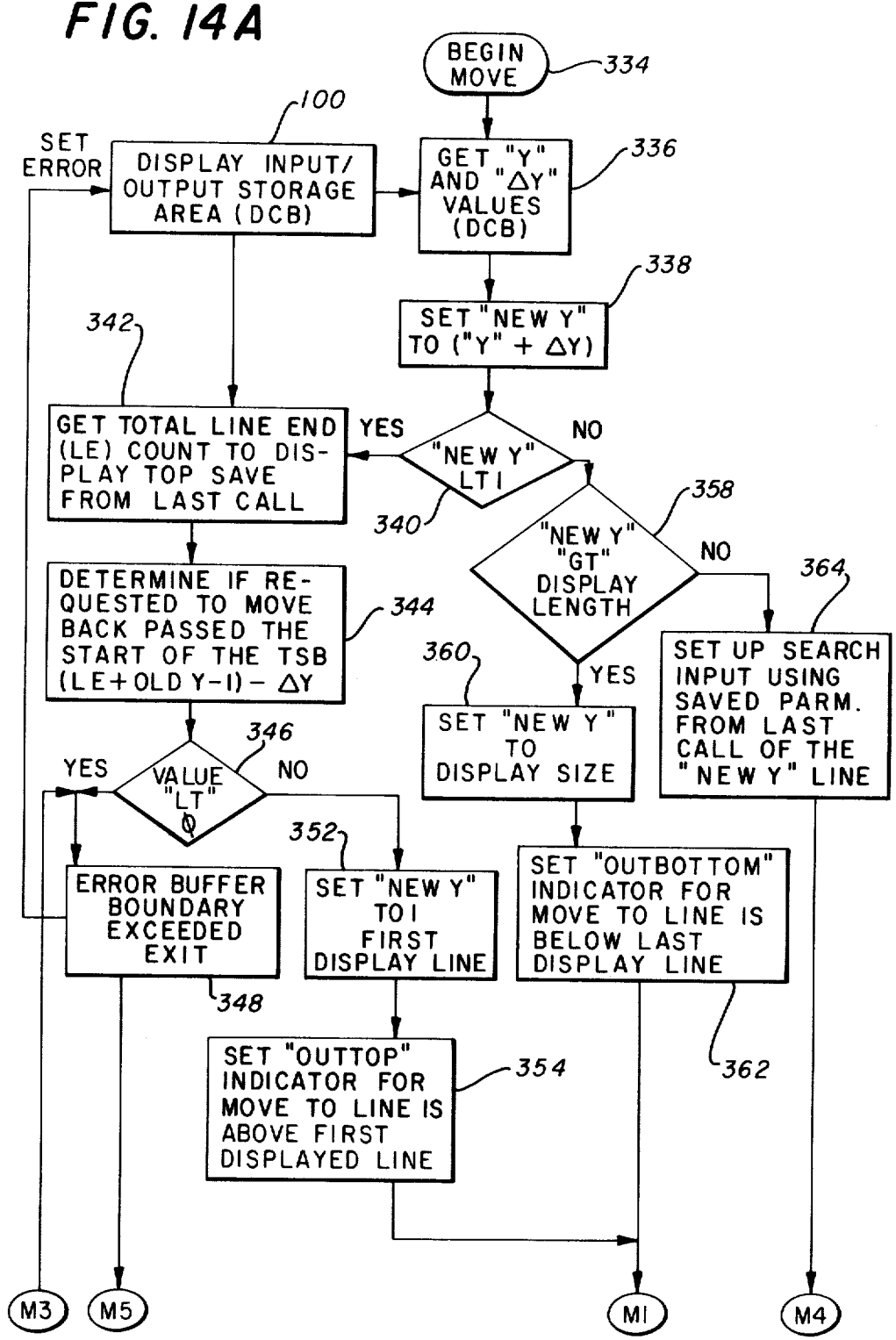
FIGS. 14A, 14B and 14C illustrates the operation of a subroutine as called during the servicing of the display routine of FIG. 6 for moving a display cursor in the refresh buffer.
Figure 14B:
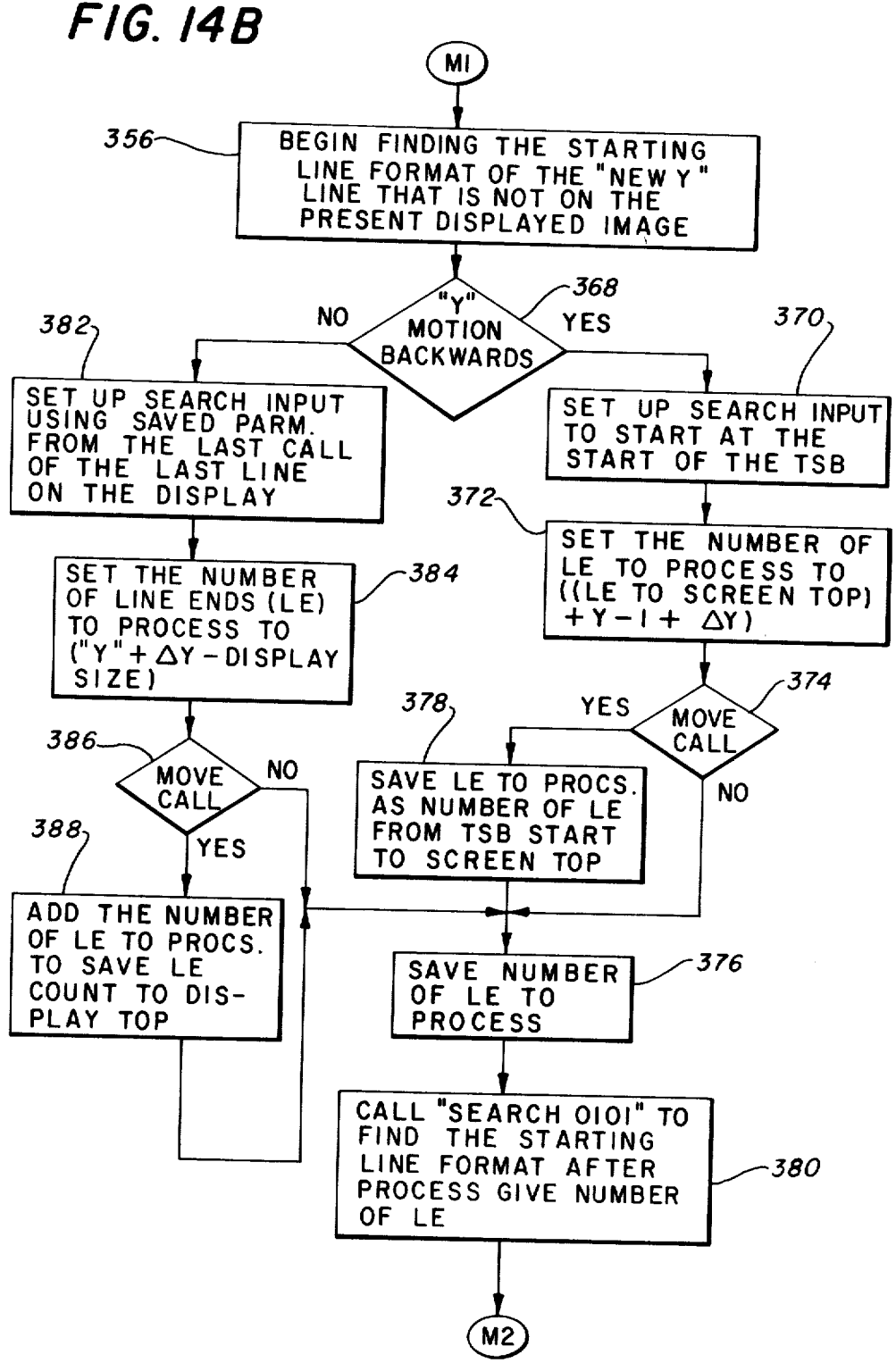
Figure 14C:
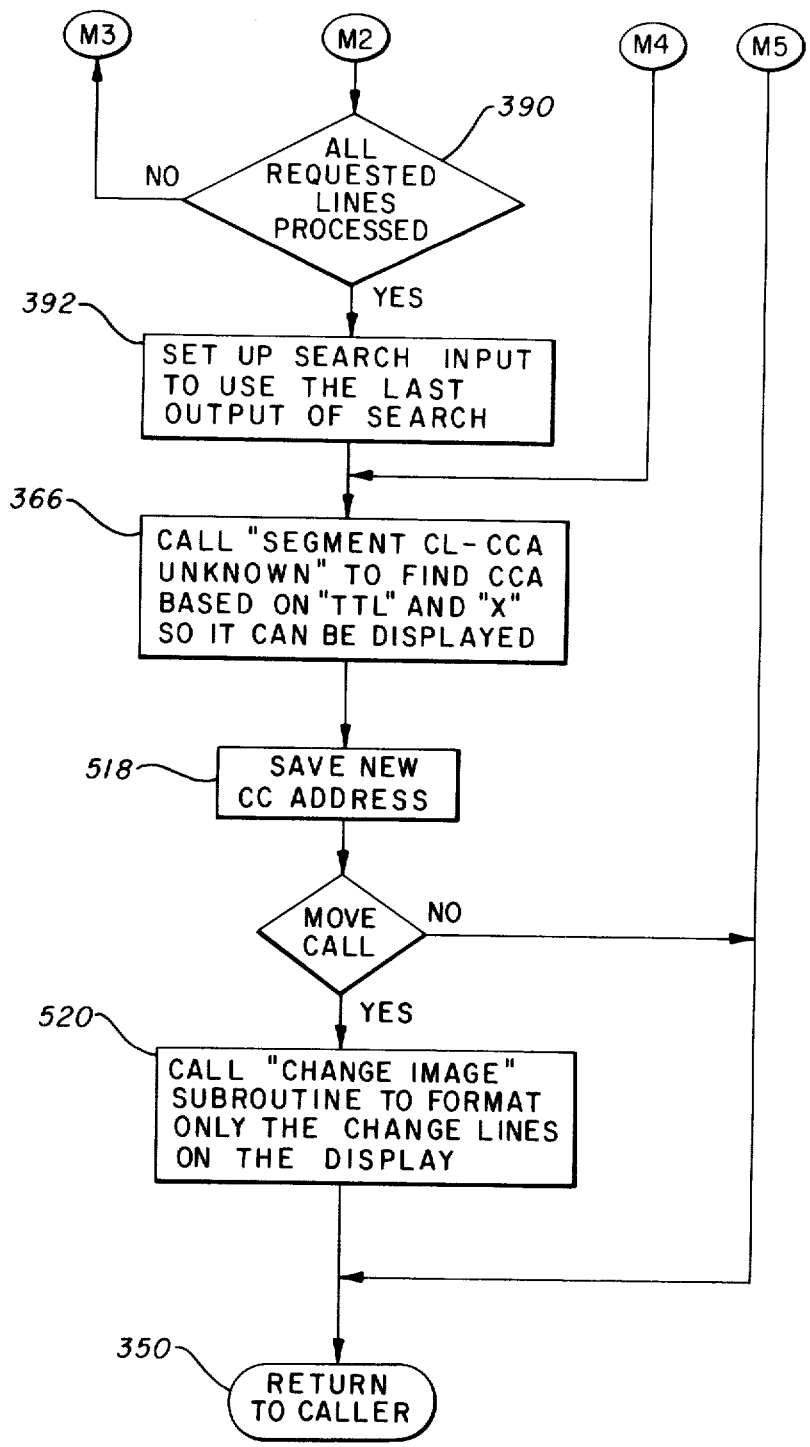
Figure 15A:
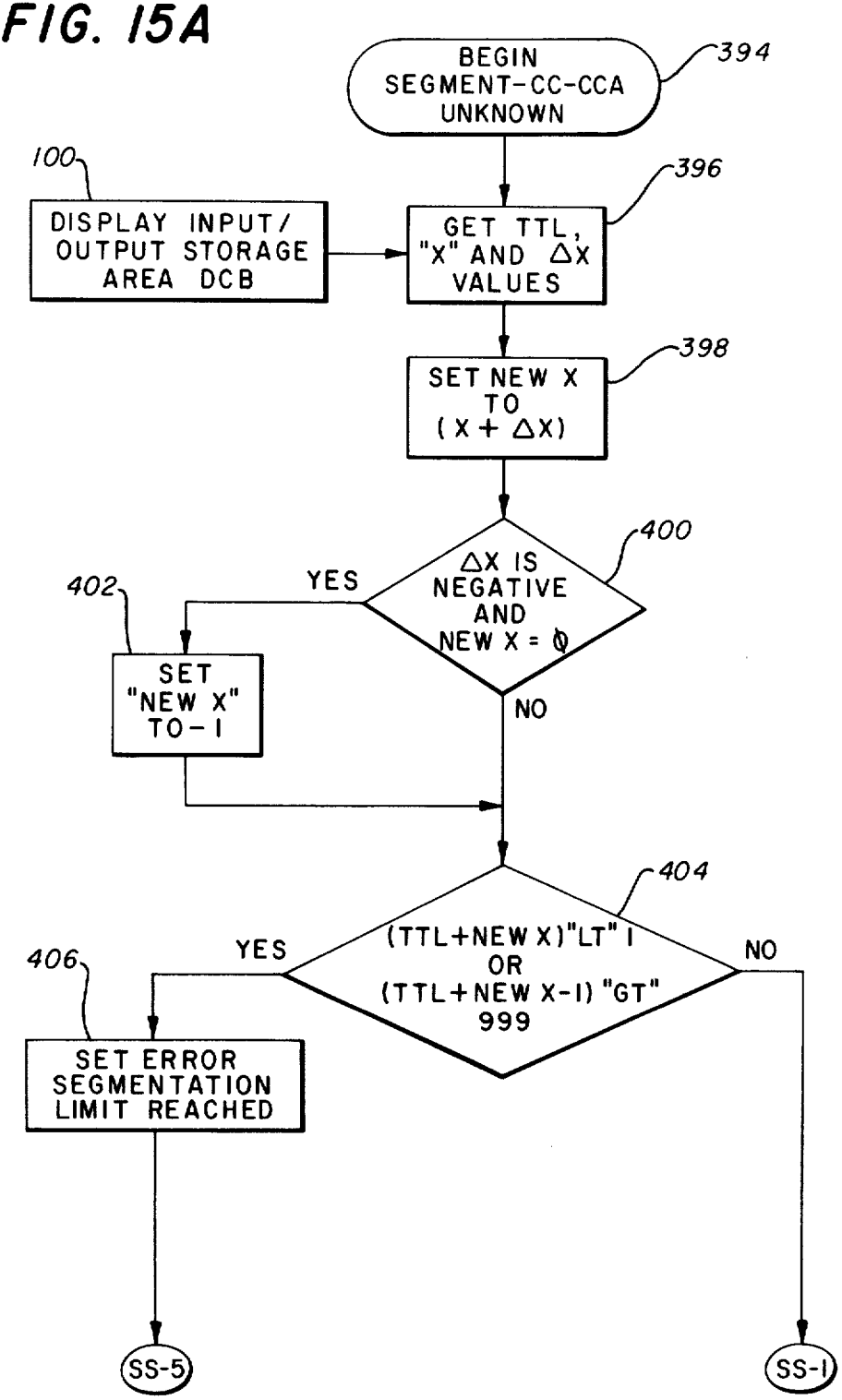
FIGS. 15A, 15B, 15C and 15D illustrates the operation of a subroutine called during the servicing of the subroutine of FIGS. 14A, 14B, and 14C for segmenting the display when the contextual cursor address is unknown.
Figure 15B:
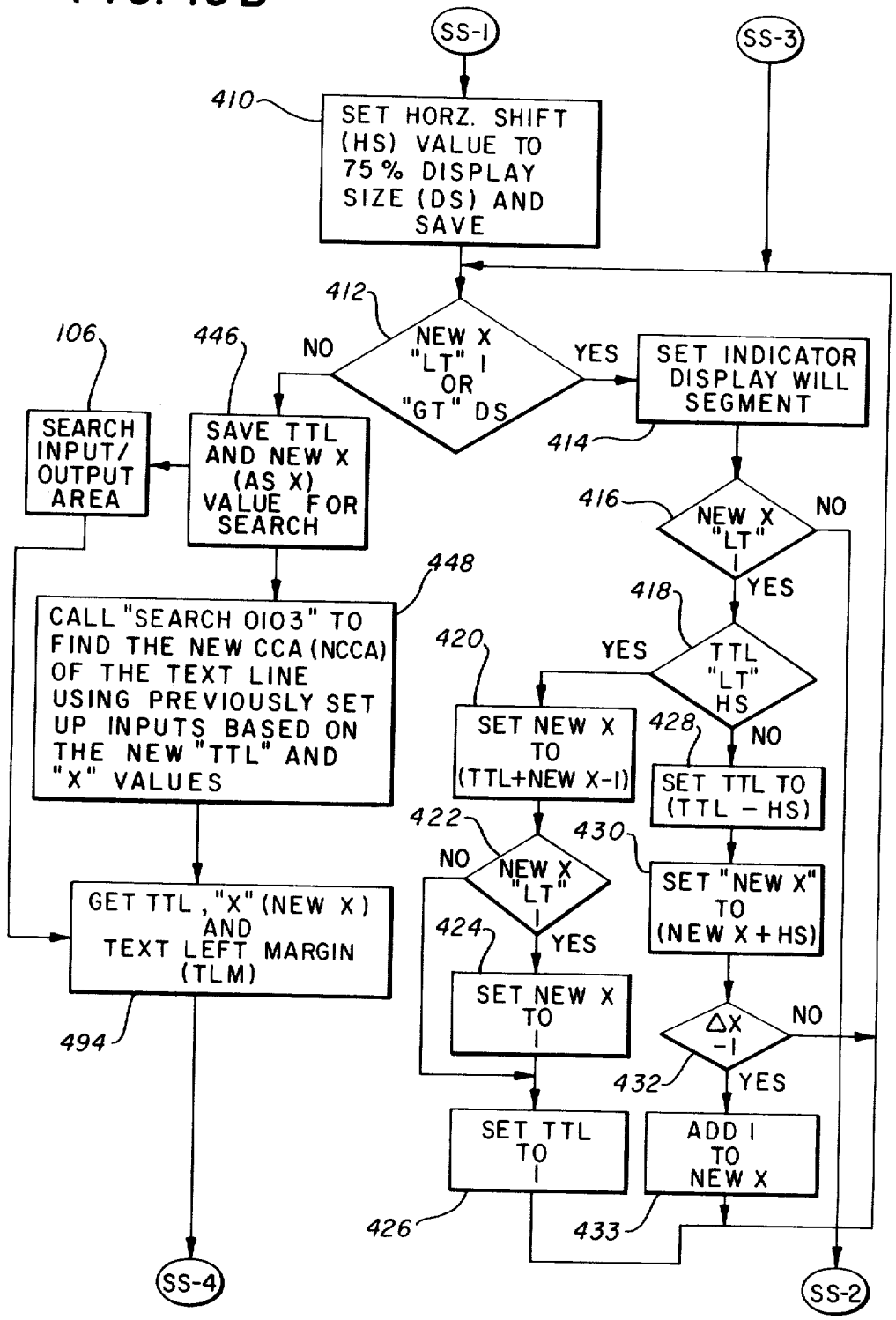
Figure 15C:
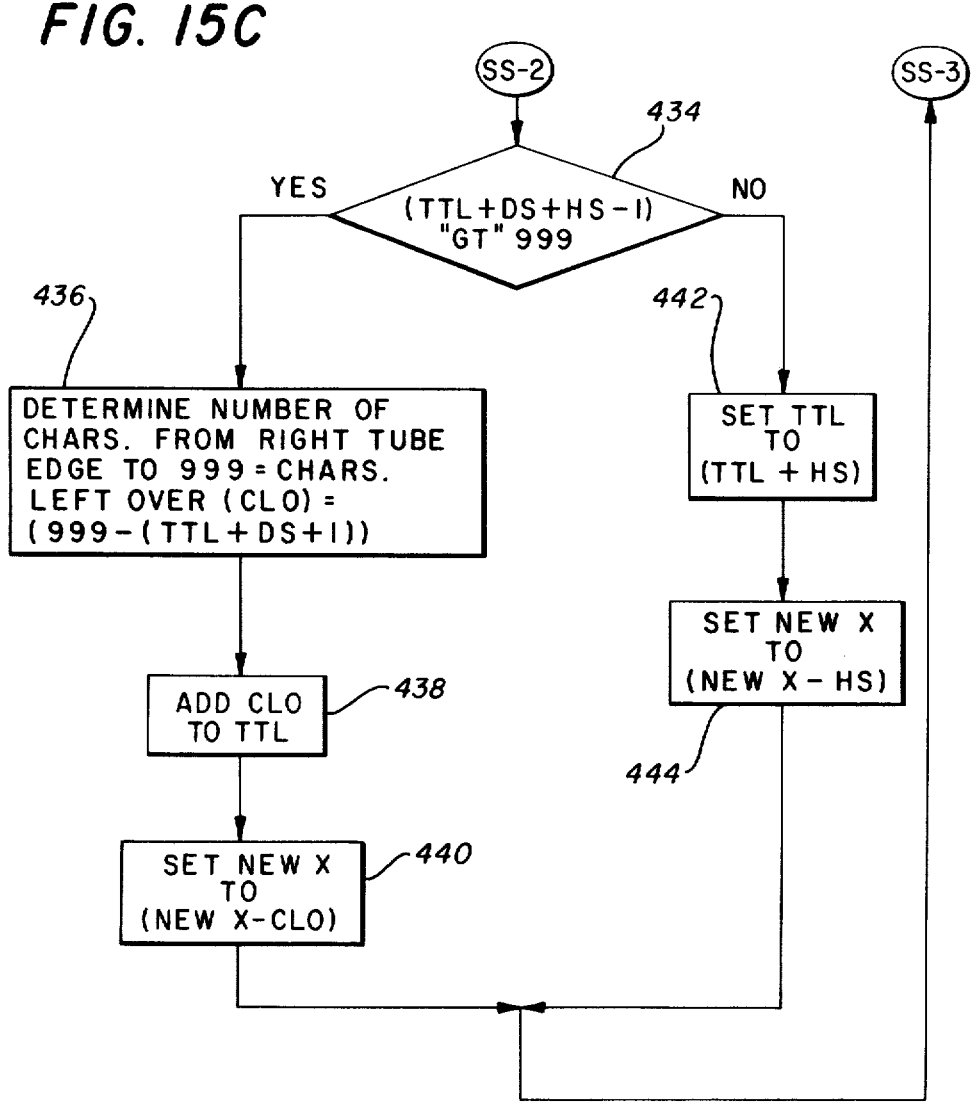
Figure 15D:
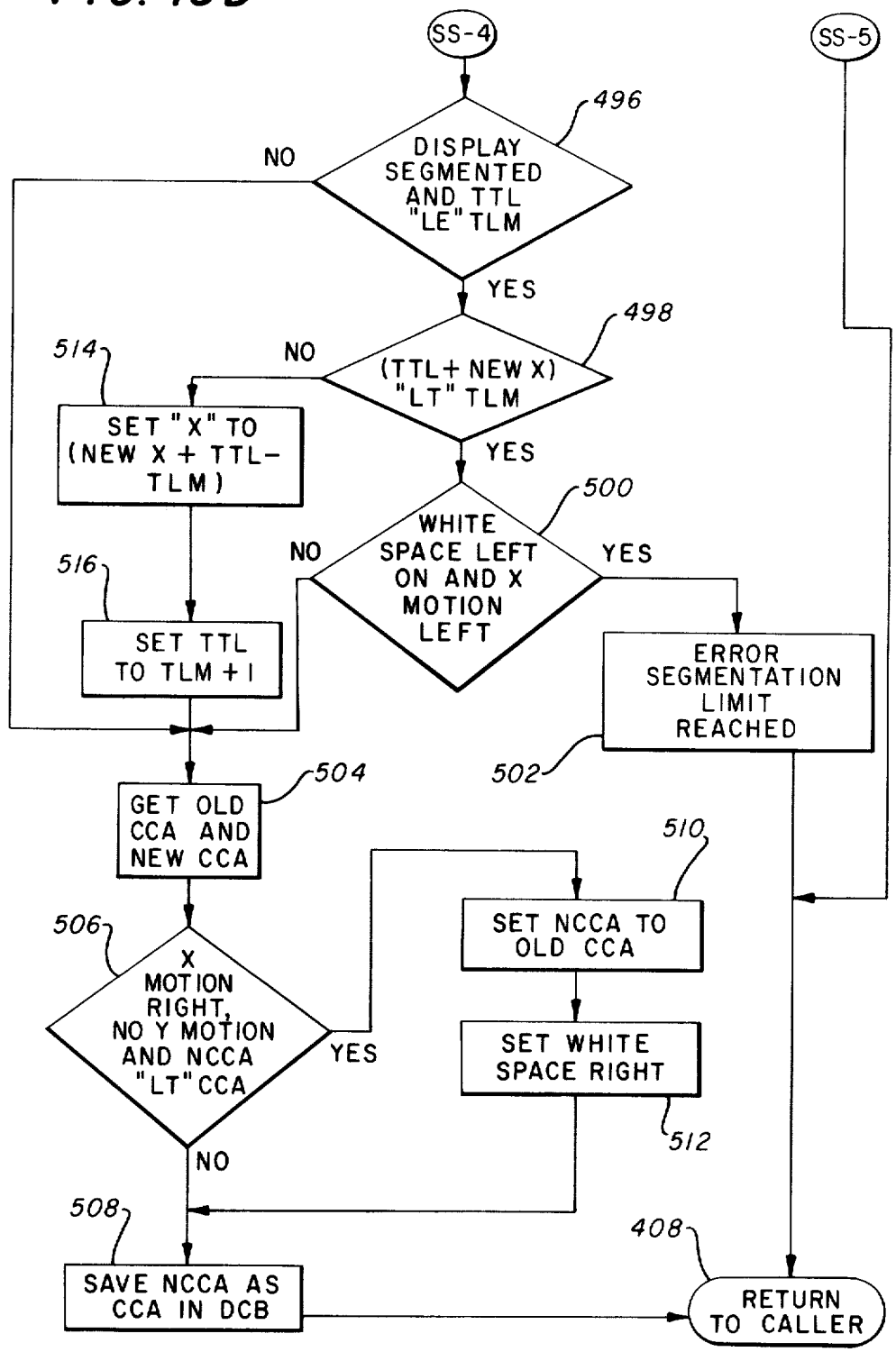

Referring to FIGS. 14A, 14B and 14C, when the control block 86 sets a bit to call the MOVE subroutine 90 a move command 334 is input to the DAM program 68. Initially, Y position values and $\Delta Y$ values are retrived at sequence 336 from the storage area 100. Following retrieval of the parameters from the display control block 66 the move subroutine first determines the new spatial Y position for the cursor. The first operation is to set the new Y value during sequence 338 to Y plus $\Delta Y$. The Y and $\Delta Y$ values were previously retrieved during sequence 336. Note, that previously the UPDATE and MOVE subroutines first calculated the X position and then the Y position for the spatial cursor. However, for a MOVE subroutine the Y position is first determined.

Next a test 360 is made to determine if the new Y position is less than one. If the new Y value is less than one then essentially the line identified with the new Y position is above the top line of the display screen 26. Under this condition the line end count total previously stored is retrieved at sequence 342 from the storage area 100 to obtain the total number of line ends from the top line of the display. Following this retrieval from the storage area 100 a test 344 is made to evaluate whether the requested move backward puts the new Y position beyond the start address of the text storage buffer 64. This is given by the formula $(\text{LE-old Y} - 1) - \Delta Y$. If this value is less than zero, then the indication is that the new Y position value is in error and appears on a line before the start in the text storage buffer. The testing of the Y value from the calculation at sequence 344 is made at test 346. When the value is less than zero an error code is set at sequence 348 to be stored in the storage area 100 and an exit code is generated to return the routine to the DAM program 68 at the return to caller 350.

If at the test 346 the value set at sequence 344 is not less than zero then the new Y value is set during sequence 350 to one as the first display line and then the out top indicator is set at sequence 354 to move the first line above the first displayed line. Following the setting of the out top indicator at sequence 354 the move subroutine advances to find the starting line format of the line identified with the new Y value that is not on the present display image; this identification is made at sequence 356.

Returning to the test 340, when the new Y value is greater than one a test 358 is made to determine if the new Y value is greater than the display length. If it is, then the new Y value is set during sequence 360 to the display size and the out bottom indicator is set at sequence 362 for a move to a line below the last line on the display screen 26. After setting the out bottom indicator at sequence 362 the move subroutine advances to the sequence 356.

When the new Y value as checked at the test 358 is not greater than the display length an input search is set up at 364 using parameters from the last call to the DAM program 68 where the parameters are for the line identified by the new Y value, not the line identified by the old Y value. This path is entered in the move subroutine because a negative test 358 indicates that the new Y value is within the outline limits of the display screen 26 and the starting address and the text, left margin address are known. Thus the subroutine has identified the location of the line identified by the new Y position value but the new contextual cursor address on this line is not known. Following the search input set up at 364 a subroutine 366 is called and is identified by the title "Segment CL-CCA Unknown". This subroutine will be subsequently described.

When the MOVE subroutine enters the sequence 356 the format for the line identified by the new Y position value is defined. Assuming for a first case that the new Y value identifies a line in the backwards direction in which case the input search must start at the first line in the text storage buffer 64. The number of line ends to be processed is the number of line ends to the top of the display plus the Y value minus one plus $\Delta Y$. This sequence is entered when the test 368 produces a positive response to the inquiry with the Y motion in the backward direction. Following the test 368 a search inputs are set up to the start of the beginning of text storage buffer 64 at sequence 370 and the number of line ends to process in 372 in accordance with the formula ($[$(LE to screen top$)+Y-1]+\Delta Y$). Following the set up of the number of line ends to process, a test 374 is made to determine if the move subroutine of FIG. 14 was called by a move command. If not the number of line ends is saved for processing at sequence 376. When the MOVE subroutine is entered as a result of the move call the test 374 proceeds to sequence 378 to save the line ends to process as the number of line ends from the text storage buffer start to the display top line in display storage 100. The number of line ends is then saved in sequence 376 and the routine advances to call the 0101 search subroutine at command 380. The 0101 search subroutine has been previously described and is called at this time to find the starting line format after the processor gives the number of line ends.

Returning to the test 368, if the Y motion is in the forward direction, then search inputs are se up at sequence 382 using parameters saved from the last call of the last line on the display. Next the number of line ends to process are saved at sequence 384 to process the formula: $Y+\Delta Y-DS$. A test 386 is made to determine if this subroutine was called as a result of a move command and if not, then the number of line ends is saved at sequence 376. If a move command is found at test 386 then the number of line ends to process is added to the line end count of the display top at sequence 388. The number of line ends is again saved at sequence 376.

After completing the 0101 search subroutine to find the format of the new line, the MOVE subroutine completes the test 390 to determine if all the requested lines have been processed. If all the requested lines are not processed in the 0101 search subroutine then an error condition exists and an error code is set at sequence 348 and the subroutine exits to be returned to the caller at return 360. This error generally indicates that the number of lines to be processed in the 0101 search routine exceeds the boundaries of the text storage buffer 64.

When all the lines have been processed as determined by the test 390 search inputs are set up at sequence 392 using the last output from the search to do a segmentation of the cursored line where the contextual cursor address is unknown. The contextual cursor address is determined by using text tube left parameters and X-position parameters. This segmentation routine is called at command 366 as previously entered from the search input set-up at sequence 364.

Referring to FIGS. 15A, 15B, 15C and 15D, there is shown a flow chart of the segmentation subroutine where the contextual cursor address is unknown. This subroutine is called at command 366 by command 394. After entering the subroutine the text tube left, X position and $\Delta X$ values are retrieved at sequence 396 from the storage area 100. A new X value is set at sequence 398 which is equal to the old X value plus $\Delta X$ and this "new" X value is evaluated at test 400. The test 400 determines if the $\Delta X$ value is negative and the "new" X value equal to zero. If both of these conditions exist, the new X value is set to $-1$ at sequence 402 and a test 404 is made to determine if the new X position plus the text tube left position is less than one, that is, off the left paper edge, or if the text tube left value plus the new X value minus one is greater than the number 999. The test 404 is also made when the $\Delta X$ is positive and the new X value not equal to zero as determined by the test 400. If either of the evaluations made at the test 404 is positive, then an error condition exists and an error segmentation limit to set at sequence 406 to advance the subroutine to be returned to the caller at return 408 which is the move subroutine of FIGS. 14A, 14B and 14C.

When the test 404 result is negative, a horizontal shift is set at sequence 410 where the shift value is 75% of the display size. This shift value is saved and a test 412 is made to determine if the "new" X value from sequence 398 is less than one or greater than the display size. If the new X is less than one or greater than the display size then a display segment indicator is set at sequence 414 because the new X value is not within the outline of the display screen 26. Next the test 416 is made to determine if the new X value is less than one. If it is then a test 418 is made to determine if the text tube left value is less than the horizontal shift. When this test produces a positive result the new X value is set to the text tube left position plus the new X value minus one as given by the formula: TTL+new X−1. Another test 422 is then made to determine if the new X value as set at sequence 420 is less than one. If it is less than one, then another new X value is set to one at sequence 424. If the new X falue as set at sequence 420 is not less than one then the routine jumps to set the text tube left value to one at sequence 426 which is also called from setting the new X value to one at sequence 424. Following setting of the text tube left to one, the subroutine returns to the test 412 and the loop recycles.

If the test 418 shows that the text tube left position is not less than the horizontal shift then the text tube left position is set at sequence 428 to the text tube left position minus the horizontal shift as given by the formula: TTL−HS. Next a new X value is set at sequence 430 to the X value checked at test 416 plus the horizontal shift. A test 432 is made to determine if ΔX is equal to one. A negative result of this test returns the subroutine to the test 412. When the ΔX value is −1 then one is added to the new X value resulting from sequence 432 at a sequence 433. The new X value resulting from sequence 433 is then evaluated at test 412. This loop continues to recycle through tests 412, 416 and 418 until the test 416 shows that the new X value is not less than one. This means that it is greater than the display size as a result of the test 412.

Following the test 416 a test 434 is made to see if the new text tube left value plus the display size plus the horizontal shift minus one is greater than the preselected number 999. This test is given by the formula: (TTL+DS+HS−1) greater than 999. When the result of the test 434 is positive then a determination is made at sequence 436 to find the number of characters between the tube right edge and 999. A determination at sequence 436 of characters left over (CLO) is given by the formula: $999-(TTL+DS+1)=CLO$. The result of the determination at sequence 436, that is the characters left over, is added to the text tube left value at a sequence 438 and a "new" X value is set to the new X value at the test 416 minus the characters left over. This new X value is set at sequence 440.

The subroutine then cycles through the test 412 and continues until the test 434 indicates a negative result. At this time the text tube left value is set at slequence 442 to a new value equal to the "old" text tube left position plus the horizontal shift. Following the setting of the new text tube left value, a new X position value is set at sequence 444 which is equal to the new X value at a test 416 minus the horizontal shift. The system now has a new text tube left value and a new X value which is saved for a search.

When the test 412 produces a negative result, indicating that the new X value is greater than one and less than the display size, that is, the new X value is within the display screen 26, then the segmentation subroutine of FIGS. 15A, 15B, 15C and 15D advances to 446 to save the new text tube left value and the new X value as the X position for running a search subroutine. These values are saved in the search area 106.

Following the storing of the values at sequence 446, a 0103 search subroutine is called at command command 448 to find a new contextual cursor address of the text line already set up with the X value and text tube left value saved at sequence 446 and the Y value previously determined.

Figure 16:
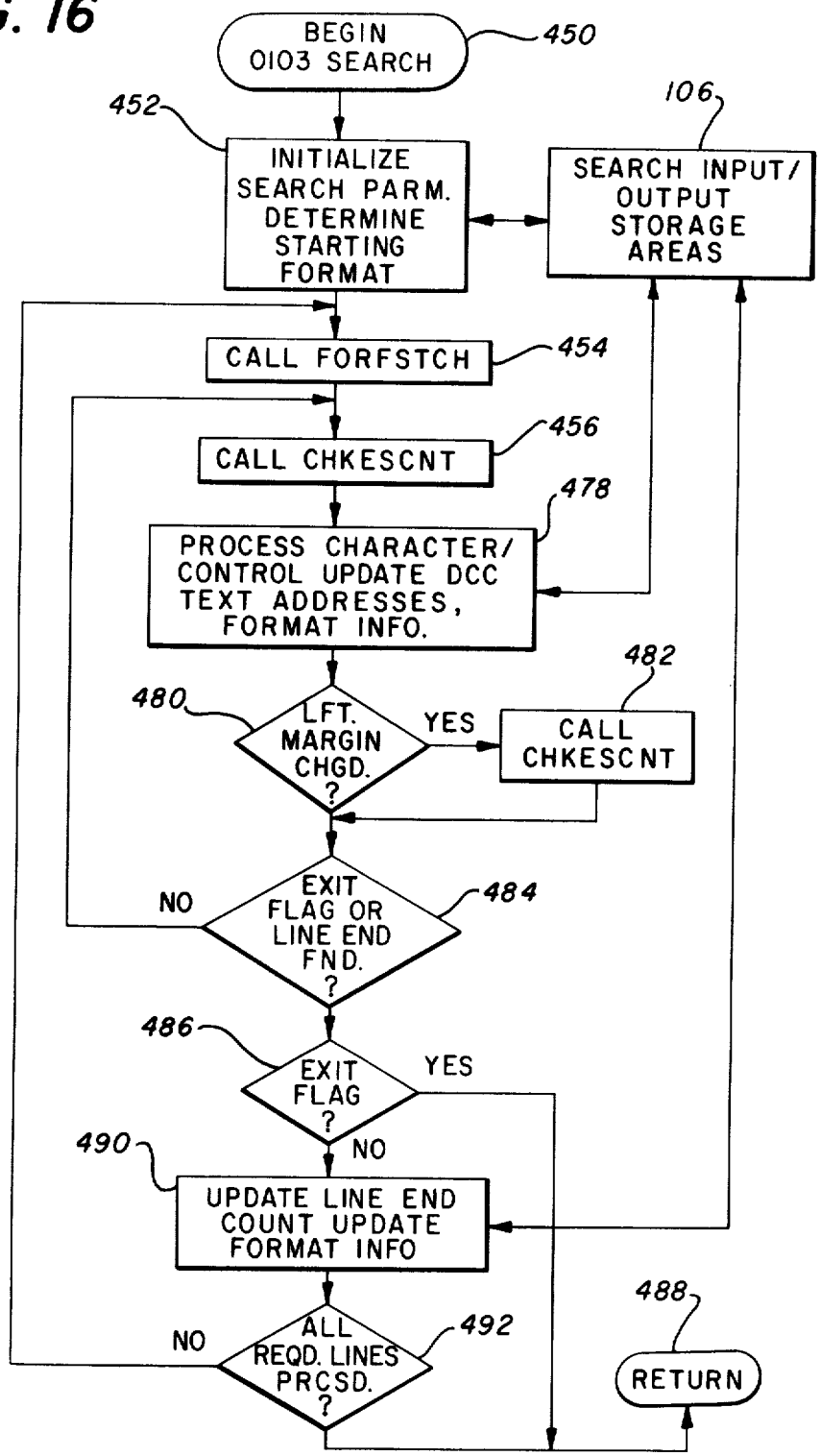
FIG. 16 illustrates the operation of a search subroutine called during the servicing of the segmentation operation of FIGS. 15A, 15B, 15C and 15D.

Referring to FIG. 16, there is shown a flow chart for the 0103 search subroutine called at 448 by the command 450. This search finds the new contextual cursor address given a displayable character count for a line previously identified. Search parameters are initialized at sequence 452 by data from the search area 106 to determine the starting format. After initialization of the 0103 search subroutine, the formatter subroutine of FIG. 11 is called which initializes the starting parameters.

Referring to FIG. 11, when the test 176 is made, a positive result advances the subroutine to a calculation and save operation 180 to determine the number of displayable characters before the X position (DYFCOFFS). The calculation of operation 180 is given by the formula: $DYFCOFFS=(TTL-1)+(X\ Screen\ Position-1)$. The subroutine of FIG. 11 then returns to the 0103 search subroutine of FIG. 16 at the return call 178.

Upon completion of the subroutine of FIG. 11 as called at sequence 454 another subroutine is called at sequence 456 to check the displayable character counter against a calculated cursor location.

Figure 17:
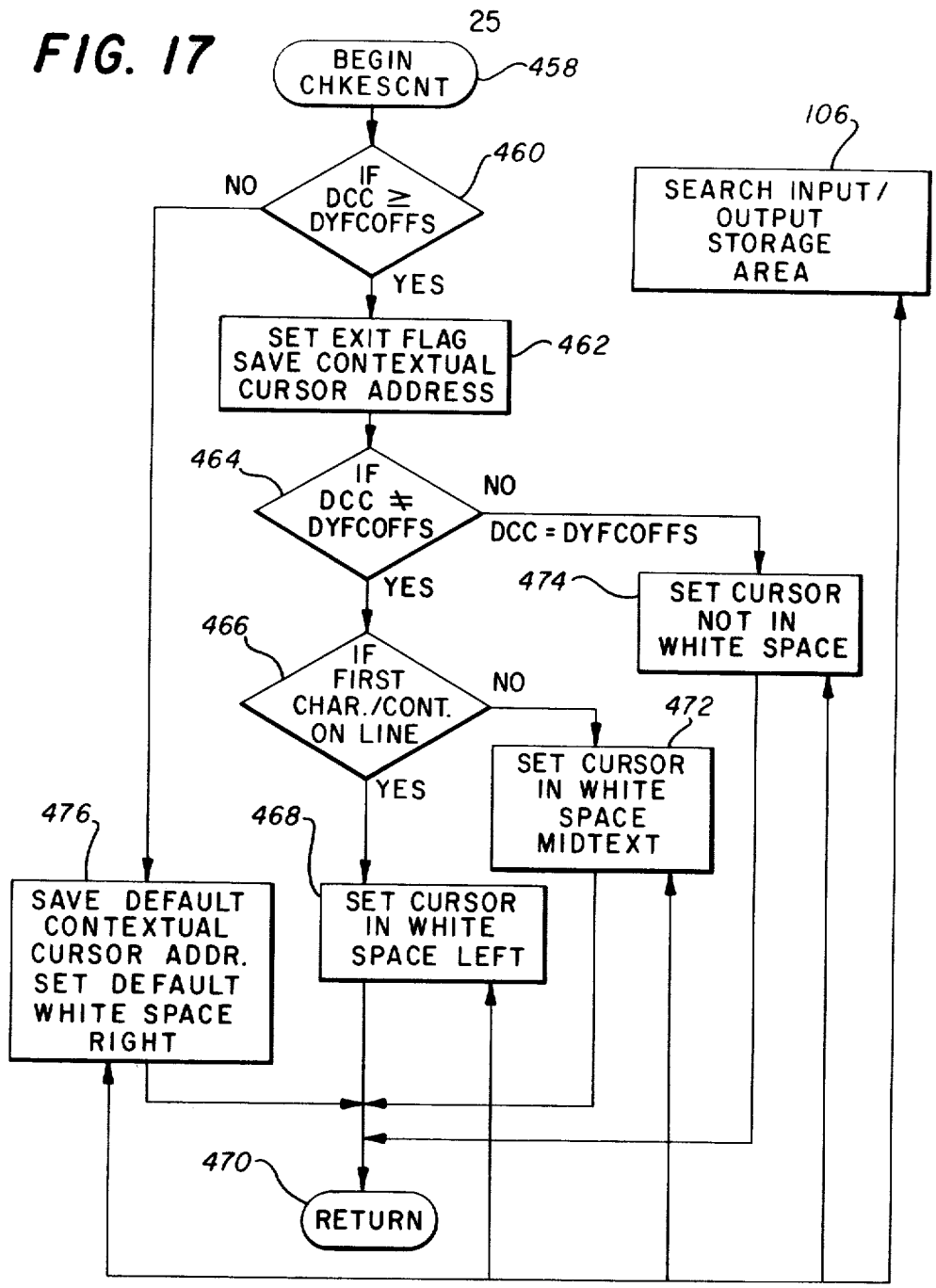
FIG. 17 illustrates the operation of a subroutine called during the servicing of the search operation of FIG. 16.

Referring to FIG. 17, the subroutine called at sequence 456 is entered at a command 458 which is followed by a test 460 to determine if the displayable character count is greater than or equal to the number of the displayable characters before the X position. If the result of this test is positive, then an exit flag is set at sequence 462 to save the contextual cursor address for display formatting. Next a test 464 is made to determine if the displayable character count is equal to the number of displayable characters before the X position. If an equality does not exist then a test 466 is made to determine if the first character byte or a control byte is on a line identified to the subroutine. If the first character byte or control byte is on the identified line then the contextual cursor address is set in "white space left" at sequence 468. The set contextual cursor address is retained in the storage area 106. When the contextual cursor address is set at sequence 468 the indication is that the cursor will appear on the display in the left margin or a temporary margin. Following sequence 468 the subroutine of FIG. 17 returns to the 0103 search subroutine at a return call 470.

Returning to the test 466, if the first character byte or control byte is not on the line identified to the subroutine then the contextual cursor address is set in white space in mid text at a sequence 472 with the address data retained in the storage area 106. Under these conditions the contextual cursor address is in white space generated in text, that is, identified by tabs.

If the displayable character count is equal to the number of displayable characters for an X position then the contextual cursor address is on a text line and set at sequence 474 for retention in the storage area 106. With the setting of the contextual cursor address at sequence 474 the subroutine returns through return 470 to the 0103 search subroutine of FIG. 16.

When the test 460 provides a negative result then a default contextual cursor address is saved at sequence 476 in the storage area 106 and a new default contextual cursor address is set in white space and also saved in the storage area 106. A contextual cursor address set at sequence 476 indicates that the cursor is in the right margin. Again this completes the subroutine of FIG. 17 and the operation returns to command 456 of FIG. 16.

Returning to FIG. 16, following a return at command 456, character byte and control byte data for the identified line is processed at sequence 478 and the displayable character count is updated. Text address and format information is also generated into the storage area 106. A test 480 is made to determine if the left margin has changed and if it has then the subroutine of FIG. 17 is again called at command 482 and returns to a test 484. The test 484 is also made when the left margin has not changed as determined by the test 480. Test 484 checks to determine if an exit flag or if a line end has been found in the identified line. If not, then the subroutine of FIG. 16 returns to sequence 456 to again call the subroutine of FIG. 17. If an exit flag or a line end has been found, then a test 486 is made to determine if it was an exit flag that was found at test 484. If it was an exit flag then the 0103 search subroutine completes and returns to the segmentation routine of FIGS. 15A, 15B, 15C and 15D at a return call 488.

If an exit flag has not been set, then following the test 486 a line end count is updated at sequence 490. Also updated at sequence 490 is format information with the updated information saved in the storage area 106. Following the updating sequence 490 a test 492 is made to determine if all the required lines have been processed by the subroutine. If not the subroutine recycles to command 454 until all the required lines have been processed at which time the subroutine of FIG. 16 completes and returns to the segmentation routine of FIGS. 15A, 15B, 15C and 15D through the return call 488.

Returning to FIGS. 15A, 15B, 15C and 15D, upon completion of the 0103 search subroutine of FIG. 16 the segmentation routine continues at command 448. The search subroutine is provided the new contextual cursor address of the identified text line using previously set up inputs based on the new text tube left value and the X value. Following completion of the 0103 search subroutine and the return to command 448, the text tube left value, the new X value, and the text left margin value are retrieved from the storage area 106 at sequence 494. Then a test 496 is made to determine if the display has been segmented and if the text tube left position is less than or equal to the text left margin position. If the result of the test 496 is positive then a test 498 is made to determine if the text tube left position plus the new X value is less than the text left margin value. Following a positive result of the test 498 a test 500 is made to check if the white space left indicator is on and motion of the display in the X position is to the left. If this produces a positive result then the cursor is on the left margin and an error code is set at sequence 502 indicating that the segmentation limit has been reached. After setting the error code at 502 the segmentation routine returns to the caller at return 408, that is the move subroutine of FIGS. 14A, 14B and 14C.

Returning to the test 496, if the display has been segmented and the text tube left value is not less than the text left margin value then the old value of the contextual cursor address is retrieved from storage area 100 at sequence 504. A test 506 is made to determine if there has been (1) any motion to the right in the X direction, (2) and Y motion direction, and (3) whether the new contextual cursor address is less than the old contextual cursor address. If the test 506 produces a negative result the new contextual cursor address is saved as the contextual cursor address in the display control block 66. This is completed during sequence 508. Following sequence 508 the segmentation subroutine returns to the move caller at return 408.

A positive result from test 506 sets the new contextual cursor address to the old contextual cursor address at sequence 510 and sets the white space right indicator at sequence 512. Again the new contextual cursor address is saved in the display control block 66 at sequence 508.

Returning to the test 498, a negative result advances the subroutine to sequence 514 to set the X value to the new X position value plus the text tube left value minus the text left margin value. This is given by the formula: $X = (new\ X + TTL - TLM)$. A new text tube left value is set at sequence 516 to the text left margin value plus one and the subroutine advances to sequence 504 to retrieve the old contextual cursor address and the new contextual cursor address from storage.

The sequence 504 is also entered when the test 500 produces a negative result indicating that the white space left indicator is not on and that there is no motion in the X direction to the left.

Returning to FIGS. 14A, 14B and 14C, following completion of the segmentation routine of FIGS. 15A, 15B, 15C, and 15D the move subroutine returns at command 366 with a contextual cursor address based on the text tube left value plus an X value. The new contextual cursor address is saved in storage at sequence 518 and a test 520 is made to determine if the move subroutine was called by a move command. If not, the move subroutine is complete and returns to the caller through return 350 which is the control block 86 of FIG. 4.

When the subroutine of FIGS. 14A, 14B and 14C was called as a result of a move command by the control block 66 then the CHANGE IMAGE subroutine is called at sequence 522. The CHANGE IMAGE subroutine is detailed in FIGS. 13A and 13B and was previously explained. At this time the CHANGE IMAGE subroutine formats only the changed lines on the display. Completion of the CHANGE IMAGE subroutine returns the DAM program 68 to sequence 522 and the MOVE subroutine is complete and returns to the caller through return 350, that is, the control block 66 of FIG. 4.

To run the MOVE subroutine of FIGS. 14A, 14B and 14C from either a move command or a CONST command (a routine to convert a spatial location to a contextually equivalent location) the DAM program 68 and the display control block 66 receives from the application program 62 either a move command or a CONST command as an input. Also input is the text storage buffer address and the text storage buffer length. The X position and Y position of a contextual cursor are input along with the text tube left value. The start address of the cursored line is also an input along with the start address of the first text line on the first line of display. The DAM program 68 and the display control block 66 also receives as inputs white space indicators along with $\Delta X$ and $\Delta Y$ values.

After running the DAM program 68 output information includes X position values and Y position values for the displayed cursor along with the text tube left value and the start address of the cursored line. Additional outputs to the display refresh buffer 24 are the start address of the first text line on the first line of the display along with the total line end count from the text storage buffer start to the first line of the display. White space indicators and boundary or segmentation limit errors are output along with the new contextual cursor address.

The MOVE subroutine is run to relocate the spatial contextual cursor and generate a new contextual cursor address. It receives from the keystroke access memory a spatial location and outputs the corresponding contextual location. The CONST subroutine of the move subroutine functions to resolve a contextual cursor address prior to calling the BUILD subroutine.

While only one embodiment of the invention, together with modifications thereof, has been described in detail herein and shown in the accompanying drawings, it will be evident that various further modifications are possible without departing from the scope of the invention.

We claim:

1. Apparatus for moving a cursor at an existing cursor spatial location on a display screen in horizontal and vertical directions in response to operator keystrokes, the display screen containing text and blank character spaces, comprising:
   a text storage buffer for storing an unformatted data stream including text to be displayed on the display screen, said display screen having spatial locations each of which has a position in the text storage buffer,
   means for processing a cursor keystroke into spatial cursor position data to identify a new cursor spatial location on the display screen where the cursor is to be moved,
   means for searching the text storage buffer for a position of an existing contextual cursor corresponding to said existing cursor spatial location,
   means for determining whether the new cursor spatial location identified by the spatial cursor position data corresponds to the position of the contextual cursor in te text storage buffer,
   means for changing the position of the contextual cursor to correspond to the new cursor spatial location if the new cursor spatial location does not correspond to the position of the contextual cursor, and
   means for displaying the cursor at the new cursor spatial location on the display screen after the position of the contextual cursor has been changed.

2. Apparatus for moving a cursor as set forth in claim 1 wherein said means for changing further comprises means for segmenting displayed text when the new spatial cursor location extends beyond either a left or right established limit of the display screen, indicating that a document stored in the text storage buffer has a width greater than a width of the display screen.

3. Apparatus for moving a cursor as set forth in claim 2 wherein said means for segmenting includes means for limiting the segmentation of the displayed text to an established left paper edge or alternatively a preset margin of the display screen when said new spatial cursor location extends beyond the left established limit of the display screen.

4. Apparatus for moving a cursor as set forth in claim 3 wherein said means for segmenting includes means for limiting the segmentation of the displayed text to a predetermined number of character spaces from the left paper edge when said new spatial cursor location extends beyond the right established limit of the display screen.

5. Apparatus for moving a cursor as set forth in claim 2 wherein said means for segmenting further includes means for scrolling displayed text vertically up or down, respectively, when the new spatial cursor location extends beyond upper or lower established limits of the display screen, respectively.

6. Apparatus for moving a cursor as set forth in claim 5 wherein said means for scrolling includes means for limiting the movement of the displayed text to preset storage limits of the text storage buffer.

7. Apparatus for moving a cursor in horizontal and vertical directions on a display screen containing text and blank character spaces in response to operator keystrokes, comprising:
   means for generating character and control data bytes in response to operator keystrokes including character and control data bytes for cursor motion,
   means for processing the character and control data bytes from said means for generating in response to operating instructions, and
   storage means having a first dedicated portion thereof for storing said operating instructions for said means for processing, a second dedicated portion thereof defining a text storage buffer for storing said character and control data bytes, a third dedicated portion thereof defining a display control block receiving input controls and formatting information from a fourth dedicated portion thereof defining an applications program to generate output controls and formatting information, a fifth dedicated portion thereof defining a display access method program block for maintaining an equivalency between a spatial position of the cursor on the display screen and a position of a contextual cursor in the text storge buffer, said storage means including a sixth dedicated portion thereof defining a display refresh buffer for outputting display signals to effect display of the text on the display screen.

8. Apparatus for moving a cursor as set forth in claim 7 wherein said storage means includes a seventh dedicated portion thereof associated with the display access method program block for storing display line formatting parameters for the operation of the display access method program block.

9. Apparatus for moving a cursor as set forth in claim 7 wherein the display access method program block stores instructions to maintain the equivalency when the spatial position of the cursor and the position of the contextual cursor correspond to the same display position.

10. Apparatus for moving cursor as set forth in claim 7 wherein the display access method program block stores instructions to maintain the equivalency when the spatial position of the cursor is in blank character space on the display screen and the contextual cursor is positioned at a first character byte in the text storage buffer following blank space.

11. Apparatus for moving a cursor as set forth in claim 7 wherein the display access method program block stores instructions to maintain the equivalency when the spatial position of the cursor is in blank character space to the left of a defined display line on the display screen and the position in the text storage buffer of the contextual cursor corresponds to a first character position on the defined display line.

12. Apparatus for moving a cursor as set forth in claim 7 wherein the display access method program block stores instructions to maintain the equivalency when the spatial position of the cursor is in blank character space to the right of a defined display line on the display screen and the position in the text storage buffer of the contextual cursor corresponds to a last character position on the defined display line.

13. A method of positioning a cursor at horizontal and vertical positions on a display screen having text lines for containing text and blank character spaces, comprising the steps of:

retrieving data from storage in response to operator keystrokes, the data including: (1) a start address of data in a text storage buffer, the text storage buffer storing the text to be displayed on the text lines, (2) a text length of the text storage buffer representing the storage capacity thereof, (3) a contextual cursor address in the text storage buffer, (4) a horizontal and vertical position on the display screen to place a contextual cursor, and (5) a number of character spaces from a left edge of a paper upon which the text in the text storage buffer will be printed, computing a plurality of outputs from the data retrieved, the plurality of outputs including (1) a starting address of a text line of the display screen on which the contextual coursor is to appear, (2) a starting address for a text line identified as a first line of text to be displayed on the display screen, (3) a total line end count from the start of the text storage buffer to the first line of text, and (4) a spatial location of a presently displayed cursor on the display screen, transferring a portion of text from said storage to a refresh buffer after the outputs have been computed, and building a visual presentation of text including the cursor on the display screen from the text transferred to the refresh buffer.

14. A method of positioning a cursor as set forth in claim 13 wherein the computed output for the spatial location of the presently displayed cursor includes: (1) the horizontal position of a cursor on a display screen, (2) a vertical position of the cursor on the display screen, (3) a text display left value, and (4) indicators of blank character spaces.

15. A method of positioning a cursor as set forth in claim 13 wherein the steps of:

retrieving data from storage, includes retrieving: (1) the start address of text in the text storage buffer, (2) the start address in the text storage buffer of the first line and a text left margin to the first line, (3) the total line end count from the start of the text storage buffer to the first line, and (4) a stop address of text in the text storage buffer, and computing a plurality of outputs includes: processing the retrieved data to generate outputs including: (1) a number of line ends processed, (2) an address of the first byte after a last line end processed, and (3) a text left margin value of each line to be displayed.

16. A method of positioning a cursor as set forth in claim 15 including the step of transferring to the refresh buffer a start address of each line displayed on the screen and a text left margin value for each line.

17. A method of positioning a cursor at horizontal and vertical positions on a display screen having text lines for containing text and blank character spaces, comprising the steps of:

retrieving data from storage in response to operator keystrokes, the data including: (1) a start address of data in a text storage buffer, the text storage buffer storing the text to be displayed on the text lines, (2) a text length of the text storage buffer representing the storage capacity thereof, (3) an address in the text storage buffer of a to be displayed contextual cursor, computing a plurality of outputs from the data retrieved, the plurality of outputs including (1) a starting address of a text line on which the new to be displayed contextual cursor is to appear, (2) a starting address for a text line identified as a first line of text to be displayed on the display screen, (3) a total line end count from a start of the text storage buffer to the first line of text and (4) a spatial location of a presently displayed cursor on the display screen, and generating parameters from the computed outputs to move the spatial location on the display screen of the presently displayed cursor to correspond to a to be displayed contextual cursor address in the text storage buffer.

18. A method of positioning a cursor at horizontal and vertical positions on a display screen having text lines for containing text and blank character spaces, comprising the steps of:

retrieving data from storage in response to operator keystrokes, the data including: (1) a start address of data in a text storage buffer, the text storage buffer storing the text to be displayed on the text lines, (2) a text length of the text storage buffer representing the storage capacity thereof, (3) a value representing a difference between a present horizontal position on the display screen corresponding to an existing contextual cursor and a horizontal position on the display screen corresponding to a to be displayed contextual cursor, (4) a value representing a difference between a present vertical position on the display screen corresponding to the existing contextual cursor and a vertical position on the display screen corresponding to the to be displayed contextual cursor, computing a plurality of outputs from the data retrieved, the plurality of outputs including (1) a starting address of a text line on which the to be displayed contextual cursor is to appear, (2) a starting address for a text line identified as a first line of text to be displayed on the display screen, (3) a total line end count from the start of the text storage buffer to the first line of text, (4) a spatial location of a presently displayed cursor on the display screen, and (5) an address of the to be displayed contextual cursor as identified by a new spatial cursor location, and generating parameters from the computed outputs identifying the new spatial cursor location of the presently displayed cursor and returning to storage the address of the contextual cursor in the text storage buffer corresponding to the new spatial cursor location.

19. A method of positioning a cursor at horizontal and vertical positions on a display screen having text lines for containing text and blank character spaces, comprising the steps of:

retrieving data from storage in response to operator keystrokes, the data including: (1) a start address of data in a text storage buffer, the text storage buffer storing the text to be displayed on the text lines, (2) a text length of the text storage buffer representing the storage capacity thereof, (3) an address in the text storage buffer of a to be displayed contextual cursor, computing a plurality of outputs from the data retrieved, the plurality of outputs including (1) a starting address of a text line on which the to be displayed contextual cursor is to appear, (2) a starting address for a text line identified as a first line of text to be displayed on the display screen, (3) a total line end count from the start of the text storage buffer to the first line, (4) a spatial location on the display screen of a presently displayed cursor, (5) a value representing a difference between a present horizontal position on the display screen corresponding to an existing contextual cursor and a horizontal position on the display screen corresponding to the new contextual cursor, and (6) a value representing a difference between a present vertical position on the display screen corresponding to the existing contextual cursor and a vertical position on the display screen corresponding to the to be displayed contextual cursor, and generating parameters from the computed outputs identifying a new spatial location on the display screen for the presently displayed cursor position for a change in the contextual cursor address in the text storage buffer.

20. A method of positioning a cursor at horizontal and vertical positions on a display screen having text lines for containing text and blank character spaces, comprising the steps of:

retrieving data from storage in response to operator keystrokes, the data including: (1) a start address of data in a text storage buffer, the text storage buffer storing the text to be displayed on the text lines, (2) a text length of the text storage buffer representing the storage capacity thereof, (3) a value representing a difference between a present horizontal position on the display screen corresponding to an existing contextual cursor and a horizontal position on the display screen corresponding to a to be displayed contextual cursor and a horizontal position on the display screen corresponding to the to be displayed contextual cursor, (4) a value representing a difference between a present position on the display screen corresponding to the existing contextual cursor and a vertical position on the display screen corresponding to the to be displayed contextual cursor, computing a plurality of outputs from the data retrieved, the plurality of outputs including (1) a starting address of a text line on which the to be displayed contextual cursor is to appear, (2) a starting address for a text line identified as a first line of text to be displayed on the display screen, (3) a total line end count from a start of the text storage buffer to the first line, (4) a spatial location of a presently displayed cursor on the display screen, and (5) an address of the to be displayed contextual cursor as identified by a new spatial cursor location, and generating parameters from the computed outputs identifying a new contextual cursor address in the text storage buffer for a change in the presently displayed spatial cursor location.

* * * * *